US009215650B2

(12) United States Patent
Jung

(10) Patent No.: US 9,215,650 B2
(45) Date of Patent: Dec. 15, 2015

(54) UPLINK CONTROL METHOD AND APPARATUS IN WIRELESS COMMUNICATION SYSTEM

(71) Applicant: Samsung Electronics Co. Ltd., Suwon-si, Gyeonggi-do (KR)

(72) Inventor: Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 13/655,813

(22) Filed: Oct. 19, 2012

(65) Prior Publication Data

US 2013/0102345 A1 Apr. 25, 2013

(30) Foreign Application Priority Data

Oct. 19, 2011 (KR) .................... 10-2011-0106791
Oct. 19, 2012 (KR) .................... 10-2012-0116788

(51) Int. Cl.
| | |
|---|---|
| *H04B 1/00* | (2006.01) |
| *H04B 7/00* | (2006.01) |
| *H04B 7/02* | (2006.01) |
| *H04B 17/00* | (2015.01) |
| *H04W 48/20* | (2009.01) |
| *H04B 7/04* | (2006.01) |
| *H04B 7/06* | (2006.01) |
| *H04W 72/02* | (2009.01) |
| *H04W 72/06* | (2009.01) |

(Continued)

(52) U.S. Cl.
CPC ............. *H04W 48/20* (2013.01); *H04B 7/0456* (2013.01); *H04B 7/0617* (2013.01); *H04W 72/02* (2013.01); *H04W 16/28* (2013.01); *H04W 52/245* (2013.01); *H04W 72/06* (2013.01)

(58) Field of Classification Search
CPC .. H04B 7/0456; H04B 7/0408; H04B 7/0617; H04B 7/0639; H04B 7/0695; H04B 7/0684; H04B 7/082; H04W 72/02; H04W 72/082
USPC ................ 455/63.4, 68–69, 101, 513, 562.1, 455/67.11, 67.13, 115.3, 134, 517
See application file for complete search history.

(56) References Cited

U.S. PATENT DOCUMENTS

| | | | |
|---|---|---|---|
| 8,848,631 B2 * | 9/2014 | Yu et al. ...................... | 370/329 |
| 2002/0105961 A1 * | 8/2002 | Hottinen et al. ............ | 370/442 |
| 2009/0274234 A1 * | 11/2009 | Astely et al. ................ | 375/267 |

(Continued)

FOREIGN PATENT DOCUMENTS

| | | |
|---|---|---|
| EP | 1802161 A1 | 1/2006 |
| WO | 01/05184 A1 | 1/2001 |
| WO | 2004/042963 A1 | 5/2004 |

*Primary Examiner* — Simon Nguyen
(74) *Attorney, Agent, or Firm* — Jefferson IP Law, LLP

(57) ABSTRACT

An UpLink (UL) control method and apparatus for in a wireless communication system supporting beamforming are provided. A method of a Mobile Station (MS) for UL control in the wireless communication system supporting the beamforming includes receiving a plurality of DownLink (DL) reference signals from a plurality of Base Station (BS) transmission beams using a plurality of MS reception beams having different directivity, measuring a path loss based on a reception signal strength of each of the plurality of DL reference signals received through different transmission/reception beams, selecting an MS transmission beam for uplink based on the path loss value measured for each of the plurality of DL reference signals, and transmitting a UL signal to a BS using the selected MS transmission beam.

26 Claims, 17 Drawing Sheets

(51) Int. Cl.
*H04W 16/28* (2009.01)
*H04W 52/24* (2009.01)

(56) References Cited

U.S. PATENT DOCUMENTS

| | | | |
|---|---|---|---|
| 2009/0318157 A1* | 12/2009 | Hoshino et al. | 455/450 |
| 2010/0120370 A1* | 5/2010 | Ishii | 455/67.11 |
| 2010/0150267 A1 | 6/2010 | Zangi | |
| 2012/0076031 A1* | 3/2012 | Zeira | 370/252 |
| 2012/0213109 A1* | 8/2012 | Xu et al. | 370/252 |
| 2012/0236741 A1* | 9/2012 | Xu et al. | 370/252 |
| 2013/0029657 A1* | 1/2013 | Gao et al. | 455/422.1 |
| 2013/0272158 A1* | 10/2013 | Park et al. | 370/252 |
| 2013/0310077 A1* | 11/2013 | Siomina et al. | 455/456.2 |
| 2014/0056256 A1* | 2/2014 | Kim, et al. | 370/329 |
| 2014/0321406 A1* | 10/2014 | Marinier et al. | 370/329 |

* cited by examiner

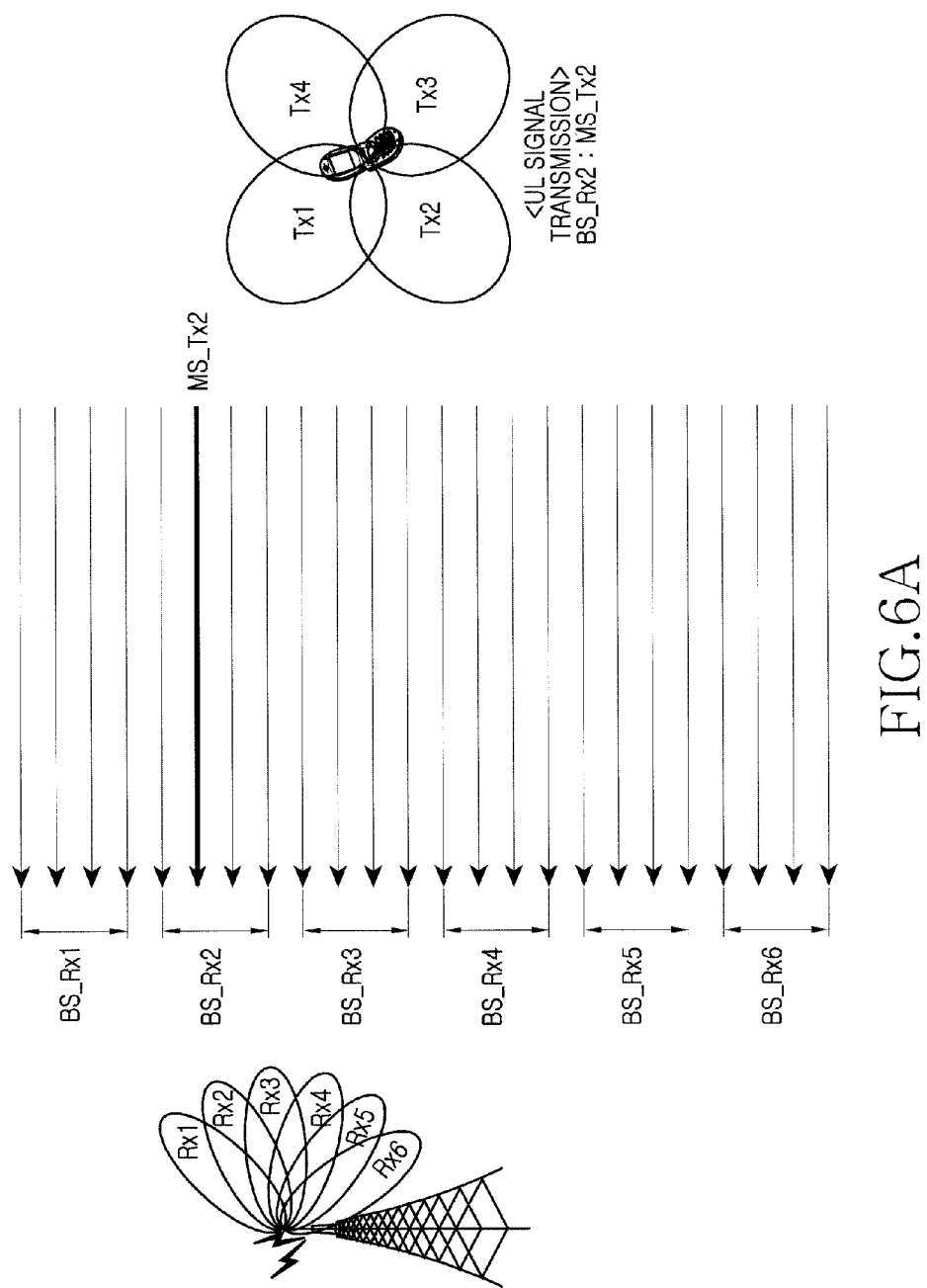

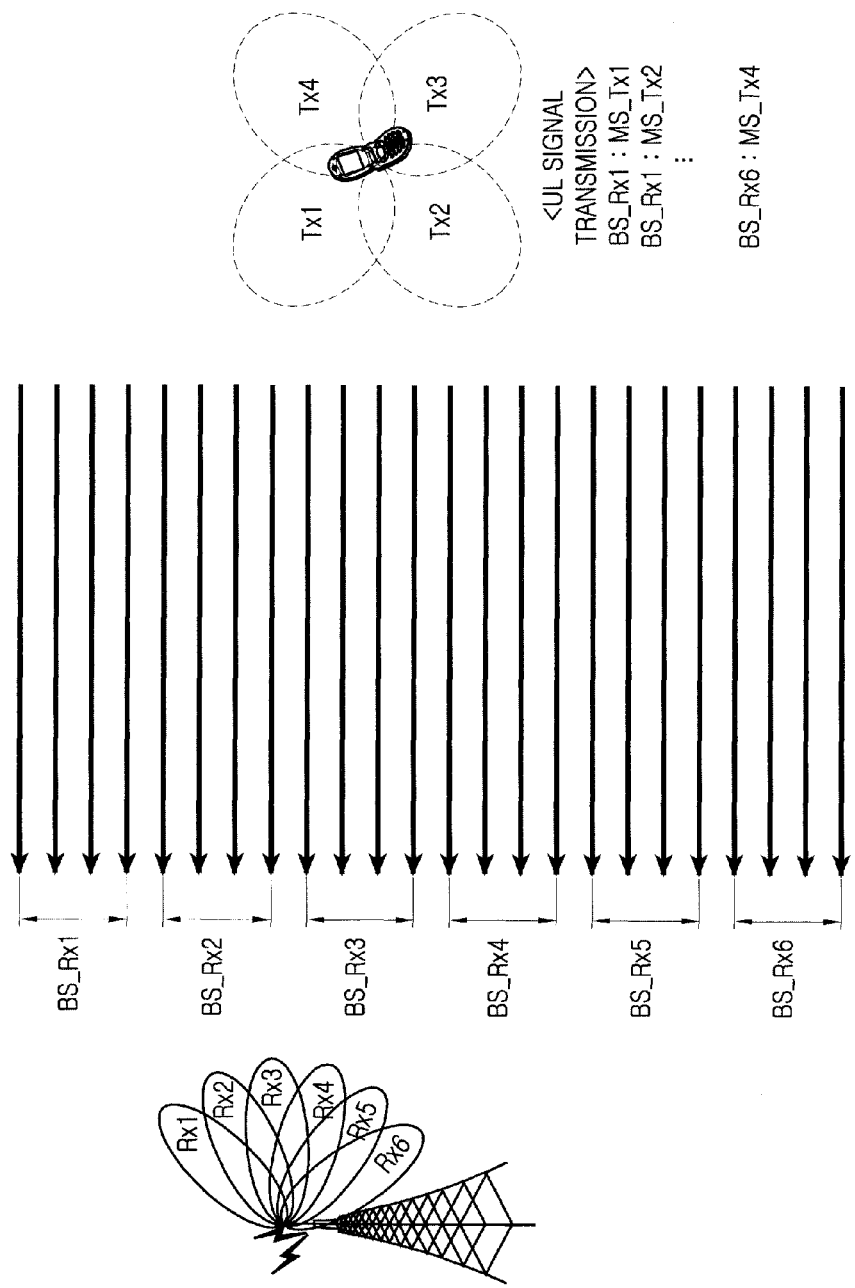

UPLINK CONTROL METHOD AND APPARATUS IN WIRELESS COMMUNICATION SYSTEM

PRIORITY

This application claims the benefit under 35 U.S.C. §119 (a) of a Korean patent application filed on Oct. 19, 2011 in the Korean Intellectual Property Office and assigned Serial No. 10-2011-0106791 and a Korean patent application filed on Oct. 19, 2012 in the Korean Intellectual Property Office and assigned Serial No. 10-2012-0116788, the entire disclosure of which is hereby incorporated by reference.

BACKGROUND OF THE INVENTION

1. Field of the Invention

The present invention relates to an UpLink (UL) control method and apparatus in a wireless communication system. More particularly, the present invention relates to a UL control method for access of a Mobile Station (MS) to a Base Station (BS) in a wireless communication system.

2. Description of the Related Art

The amount of average data used by mobile communication subscribers is geometrically increasing, and the demand of users for a higher data transmission rate is increasing at a similar rate. To address this growing demand for a high data transmission rate, research is in progress for introducing a communication technology of an ultra-high frequency band of 30 Giga Hertz (GHz) or more, i.e., a millimeter wave system.

In the millimeter wave system, a serious propagation path loss occurs and the coverage of a BS is considerably decreased. To address this issue in the millimeter wave system, it is expected that a beamforming technology for concentrating a transmission/reception power into a narrow space to increase the transmission/reception efficiency of an antenna would be introduced.

FIG. 1 illustrates a wireless communication system supporting beamforming according to the related art.

Referring to FIG. 1, a BS 100 and an MS 102 may transmit/receive data using a plurality of transmission/reception beams each having different directivity. In the system supporting the beamforming, the BS 100 and the MS 102 perform beam training of transmitting/receiving a beam training signal through the plurality of transmission/reception beams having the different directivity and selecting an optimal beam. The BS 100 and the MS 102 perform beam sweeping of transmitting/receiving a beam training signal for all transmissible/receivable beam directions, measuring a reception quality of the beam training signal, and selecting a transmission beam and a reception beam that have the optimal channel environment. In the system supporting the beamforming, the beam sweeping operation is carried out in a process in which a BS and an MS establish a communication channel to start communication. For example, even a transmission beam direction used when the MS firstly performs a random access process is transmitted multiple times in multiple directions using the beam sweeping operation.

FIGS. 2A and 2B illustrate a DL beam training process using a DL reference signal as a beam training signal, and a UL beam training process using a UL random access signal in a wireless communication system supporting beamforming according to the related art.

Referring to FIGS. 2A and 3B, transmission/reception beams of the BS 100 and the MS 102 each are four in number. First, as illustrated in FIG. 2A, to establish a DL channel, the BS 100 transmits a beam training signal, i.e., a reference signal, four times using each of four transmission beams (BS_TX1, BS_TX2, BS_TX3, and BS_TX4) (4×4 times transmission). The MS 102 receives the reference signals, which have been transmitted from the four transmission beams (BS_TX1, BS_TX2, BS_TX3, and BS_TX4), four times using each of four reception beams (MS_RX1, MS_RX2, MS_RX3, and MS_RX4) (4×4 times reception). The MS 102 selects a transmission beam of the BS 100 and a reception beam of the MS 102, which correspond to a reference signal of the best reception quality. This beam training process is identically carried out to determine UL transmission beam and reception beam as illustrated in FIG. 2B.

As illustrated in FIG. 2B, to establish a UL channel, the MS 102 transmits a beam training signal, i.e., a random access signal, four times using each of four transmission beams (MS_TX1, MS_TX2, MS_TX3, and MS_TX4) (4×4 times transmission). The BS 100 receives the random access signals, which have been transmitted from the four transmission beams (MS_TX1, MS_TX2, MS_TX3, and MS_TX4), four times using each of four reception beams (BS_RX1, BS_RX2, BS_RX3, and BS_RX4) (4×4 times reception). The BS 100 selects a transmission beam of the MS 102 and a reception beam of the BS 100 according to a reception quality of the random access signal.

As described above, in the beamforming technique according to the related art, for the sake of a UL transmission/reception beam and a DL transmission/reception beam, an MS and a BS each have to perform beam sweeping of transmitting/receiving a signal for possible all transmission/reception beam directions. However, the scheme in which the MS and the BS to each transmit/receive a signal for all transmission/reception beams has a disadvantage that it is inefficient in an energy efficiency aspect or inter-MS interference aspect. Accordingly, in a wireless communication system supporting beamforming, there is a need to provide a more efficient beam training scheme, and there is a need to efficiently design even a process of UL random access that is transmitted using the beam sweeping operation.

Also, in the millimeter wave system, there is a need to efficiently set power of a random access signal, in order for an MS to overcome a path loss. In the system according to the related art, an MS measures a path loss using a difference between a reference signal transmission strength of a BS and a reference signal reception strength of the MS, and determines a transmission power based on the measured path loss. However, there is a disadvantage that, because this technique is based on a system using an omni antenna, it is difficult to be applied to a beamforming system, which causes a different path loss according to a transmission/reception beam direction.

SUMMARY OF THE INVENTION

Aspects of the present invention are to address at least the above problems and/or disadvantages and to provide at least the advantages described below. Accordingly, an aspect of the present invention is to provide a method and apparatus for controlling uplink in a wireless communication system supporting beamforming.

Another aspect of the present invention is to provide a method and apparatus in which a Mobile Station (MS) selects an UpLink (UL) transmission beam so as to perform a random access process in a wireless communication system supporting beamforming.

Another aspect of the present invention is to provide a method and apparatus in which an MS determines a UL transmission power so as to perform a random access process in a wireless communication system supporting beamforming.

Another aspect of the present invention is to provide a method and apparatus for, based on a path loss of a DownLink (DL) signal for different transmission/reception beam directions, selecting a transmission/reception beam for UL signal transmission, and determining a transmission power of the selected transmission/reception beam in a wireless communication system supporting beamforming.

The above aspects may be achieved by providing an uplink control method and apparatus for in a wireless communication system supporting beamforming.

In accordance with an aspect of the present invention, a method of an MS for UL control in a wireless communication system supporting beamforming is provided. The method includes receiving a plurality of DL reference signals from a plurality of Base Station (BS) transmission beams using a plurality of MS reception beams having different directivity, measuring a path loss based on a reception signal strength of each of the plurality of DL reference signals received through different transmission/reception beams, selecting an MS transmission beam for uplink based on the path loss value measured for each of the plurality of DL reference signals, and transmitting a UL signal to a BS using the selected MS transmission beam.

In accordance with another aspect of the present invention, a method of a BS for UL control in a wireless communication system supporting beamforming is provided. The method includes transmitting DL reference signals to a plurality of MS reception beams using a plurality of BS transmission beams having different directivity, receiving a UL signal from an MS transmission beam, which an MS has selected based on a path loss, among different transmission/reception beams formed between the BS and the MS, and determining a UL transmission/reception beam based on a reception strength of the received UL signal.

In accordance with another aspect of the present invention, an apparatus of an MS for UL control in a wireless communication system supporting beamforming is provided. The apparatus includes a beamformer and a controller. The beamformer forms a plurality of beams having different directivity. The controller controls the beamformer and receives a plurality of DL reference signals from a plurality of BS transmission beams using a plurality of MS reception beams having different directivity, measures a path loss based on a reception signal strength of each of the plurality of DL reference signals received through different transmission/reception beams, selects an MS transmission beam for uplink based on the path loss value measured for each of the plurality of DL reference signals, and transmits a UL signal to a BS using the selected MS transmission beam.

In accordance with another aspect of the present invention, an apparatus of a BS for UL control in a wireless communication system supporting beamforming is provided. The apparatus includes a beamformer and a controller. The beamformer forms a plurality of beams having different directivity. The controller controls the beamformer and transmits DL reference signals to a plurality of MS reception beams using a plurality of BS transmission beams having different directivity, receives a UL signal from an MS transmission beam, which an MS has selected based on a path loss, among different transmission/reception beams formed between the BS and the MS, and determines a UL transmission/reception beam based on a reception strength of the received UL signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 6A to 6F are diagrams illustrating an UpLink (UL) transmission beam selected based on a path loss of a beam training signal in a wireless communication system supporting beamforming according to an exemplary embodiment of the present invention;

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present invention relates to a UL control method and apparatus for access of a Mobile Station (MS) to a Base Station (BS) in a wireless communication system supporting beamforming. A method and apparatus according to exemplary embodiments of the present invention are described below, in which a Mobile Station (MS) selects a transmission beam and determines a transmission power, for the sake of UpLink (UL) random access in a wireless communication system supporting beamforming. The following description is made assuming that a DownLink (DL) path loss and a UL path loss are the same as each other for the same transmission/reception beam direction. For convenience of description convenience, a description is made assuming the same path loss for DL and UL. However, exemplary embodiments of the present invention may also be applied in the same scheme even when the DL path loss and the UL path loss are different from each other.

Figure 1:
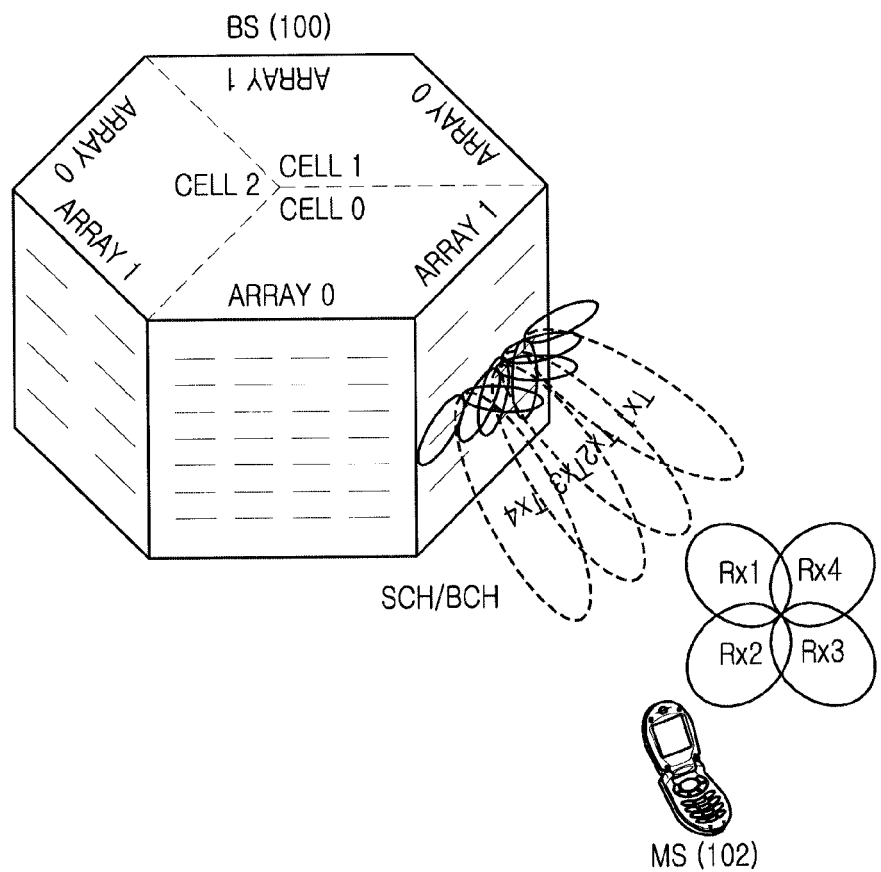
FIG. 1 is a diagram illustrating a wireless communication system supporting beamforming according to the related art.
Figure 2A:
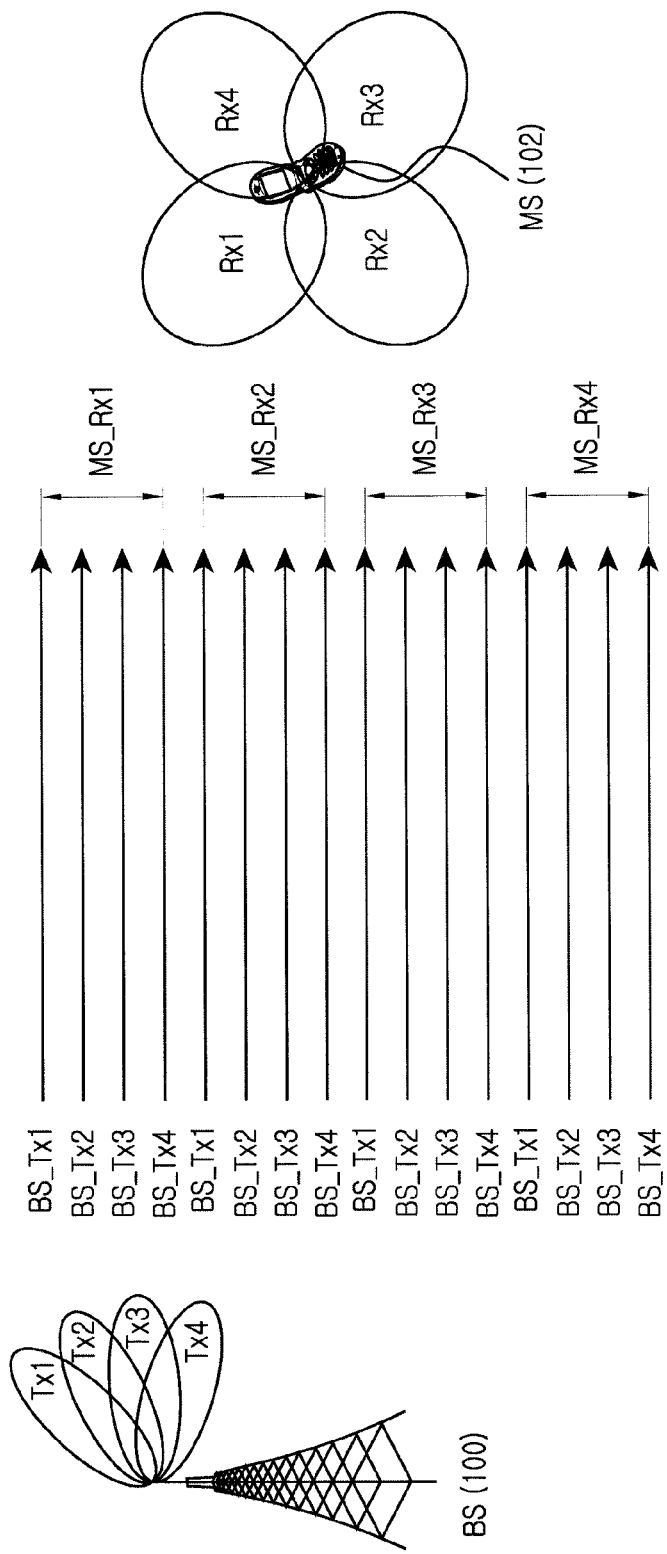
FIGS. 2A and 2B are diagrams illustrating downlink beam training, and uplink beam training using a random access operation in a wireless communication system supporting beamforming according to the related art.
Figure 2B:
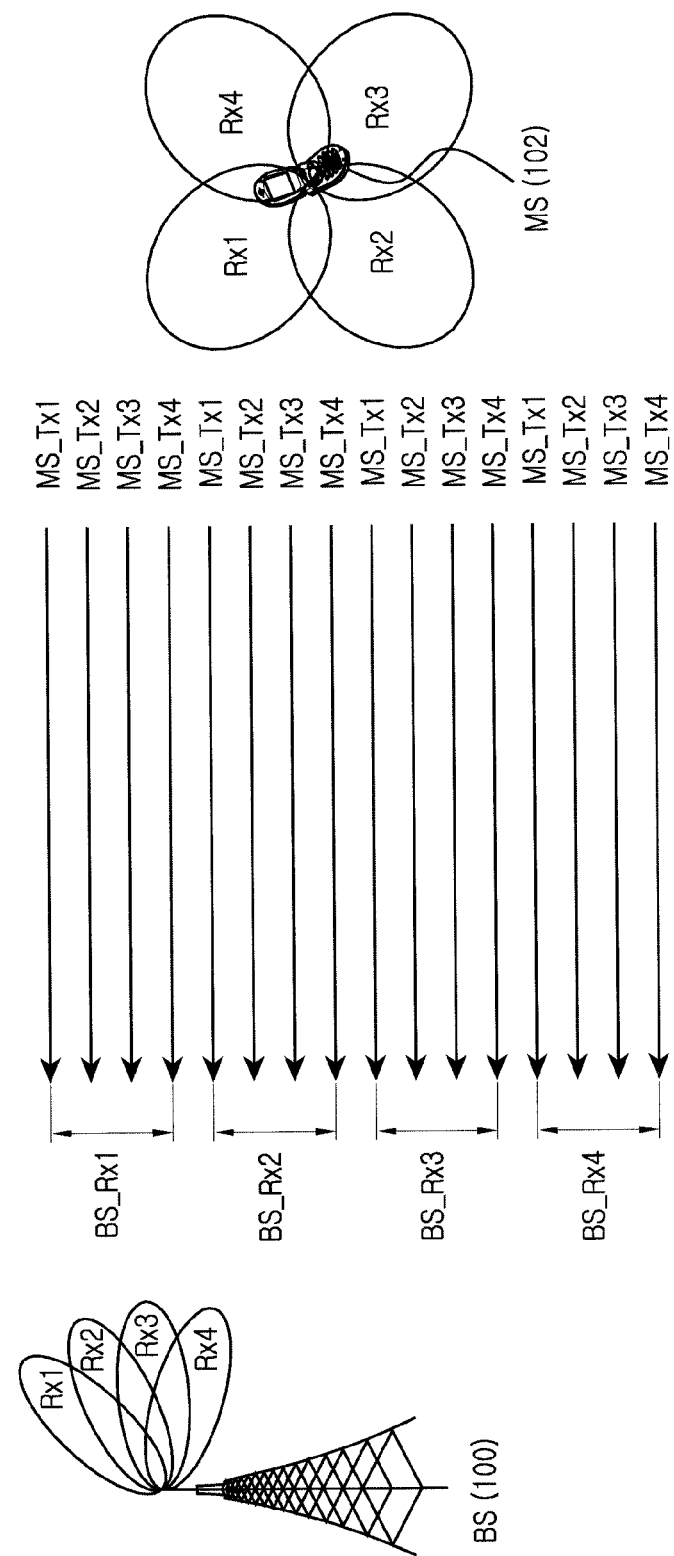
Figure 3:
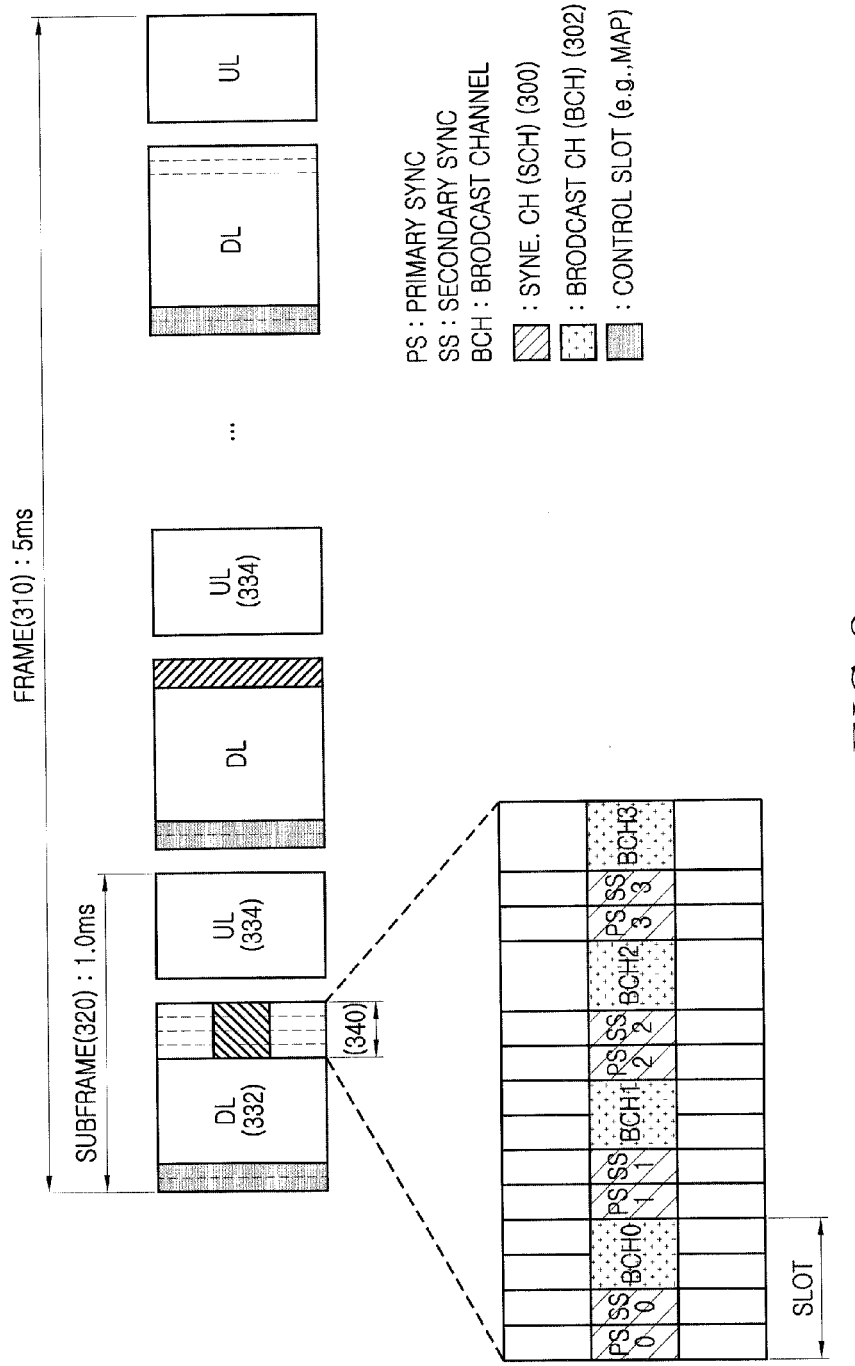
FIG. 3 is a diagram illustrating a frame structure of a wireless communication system supporting beamforming according to an exemplary embodiment of the present invention.

FIG. 3 illustrates a frame structure of a wireless communication system supporting beamforming according to an exemplary embodiment of the present invention.

Referring to FIG. 3, a frame 310 includes a plurality of subframes 320. The subframe 320 is divided into a DL duration 332 and a UL duration 334. In FIG. 3, the DL duration 332 and the UL duration 334 are distinguished at a time axis. The DL duration 332 and the UL duration 334 may also be distinguished at a frequency axis according to another exemplary embodiment of the present invention. Part of the DL duration 332 is defined as a synchronization/broadcast channel duration 340. The synchronization/broadcast channel duration 340 includes a Synchronization Channel (SCH) 300 duration and a Broadcast CHannel (BCH) 302 duration. The BCH 300 duration is for transmission of a reference signal, which is a DL beam training signal. The BCH 302 duration is for broadcasting of control information that is transmitted to the whole coverage of a Base Station (BS). Part of the UL duration 334 is defined as a Random Access CHannel (RACH) duration for transmission of a random access signal, which is a UL beam training signal.

Figure 4:
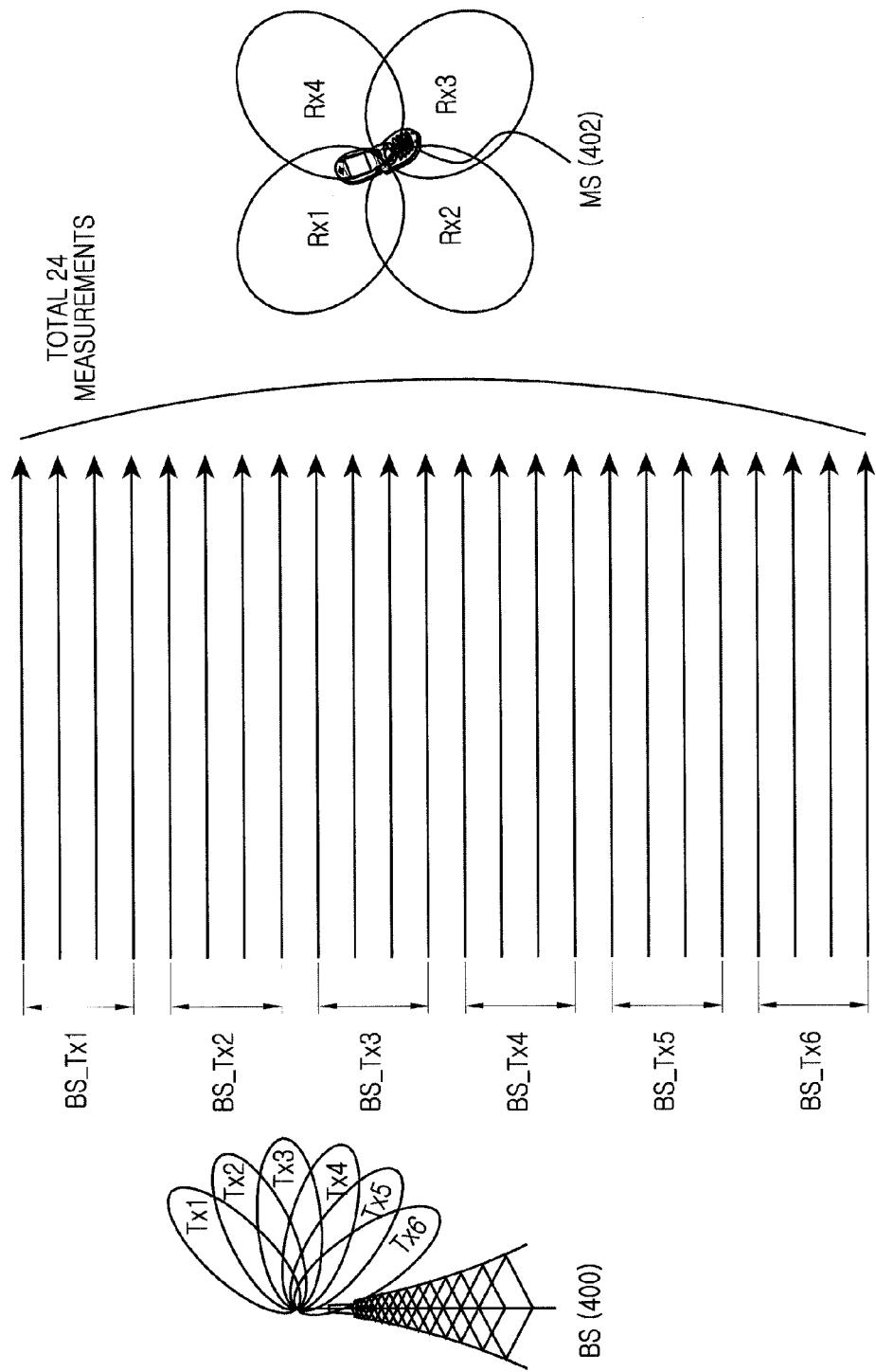
FIG. 4 is a diagram illustrating a DownLink (DL) beam training signal in a wireless communication system supporting beamforming according to an exemplary embodiment of the present invention.

According to exemplary embodiments of the present invention, as illustrated in FIG. 4 below, the BS transmits a reference signal for beam training through a plurality of transmission beams having different directivity in the synchronization channel 300 duration of the DL duration 332, and transmits control information for UL transmission power control in the broadcast channel 302 duration of the DL duration 332. The control information includes a reference signal transmission power of the BS, a UL target reception power, a UL maximal transmission power, a UL transmission power adjustment value, a response wait time and the like. Also, as illustrated in FIG. 5 below, the MS receives the reference signal, which has been transmitted from the BS, through a plurality of reception beams having different directivity, measures a path loss based on a reception strength of a reference signal for each transmission/reception beam, selects an MS transmission beam for random access based on the measured path loss and the control information, and determines a transmission power of the selected transmission beam. After that, the MS transmits a random access signal having the determined transmission power through a random access time point corresponding to the selected transmission beam, in the random access channel duration 350 of FIG. 3.

FIG. 4 illustrates a beam training process using a DL synchronization channel in a wireless communication system supporting beamforming according to an exemplary embodiment of the present invention. The following description is made assuming that a transmission/reception beam of a BS is six in number, and a transmission/reception beam of an MS is four in number.

Referring to FIG. 4, the BS 400 transmits a reference signal four times through each of six transmission beams (BS_TX1, BS_TX2, BS_TX3, BS_TX4, BS_TX5, and BS_TX6) having different directivity, in a downlink synchronization channel duration. The BS 400 transmits the reference signal four times through one transmission beam. This is to allow the MS 420 to receive the reference signals, which have been transmitted from the one transmission beam, through each of four reception beams (MS_RX1, MS_RX2, MS_RX3, and MS_RX4) having different directivity. For example, the BS 400 may transmit one reference signal repeatedly four times through the transmission beam (BS_TX1), and the MS 402 may change four reception beams (MS_RX1, MS_RX2, MS_RX3, and MS_RX4) while receiving the reference signals transmitted from the BS_TX1. The MS 402 may receive the reference signals once and more during a specific time for one pair of a transmission beam and a reception beam, calculate average signal strengths of the received reference signals, and use the average value as a reception signal strength of the pair of the transmission/reception beams. The MS may determine an average reception strength of the reference signals received once and more during the specific time, and acquire a reception signal strength excluding a spontaneous channel change of each reference signal measurement time point.

Figure 5A:
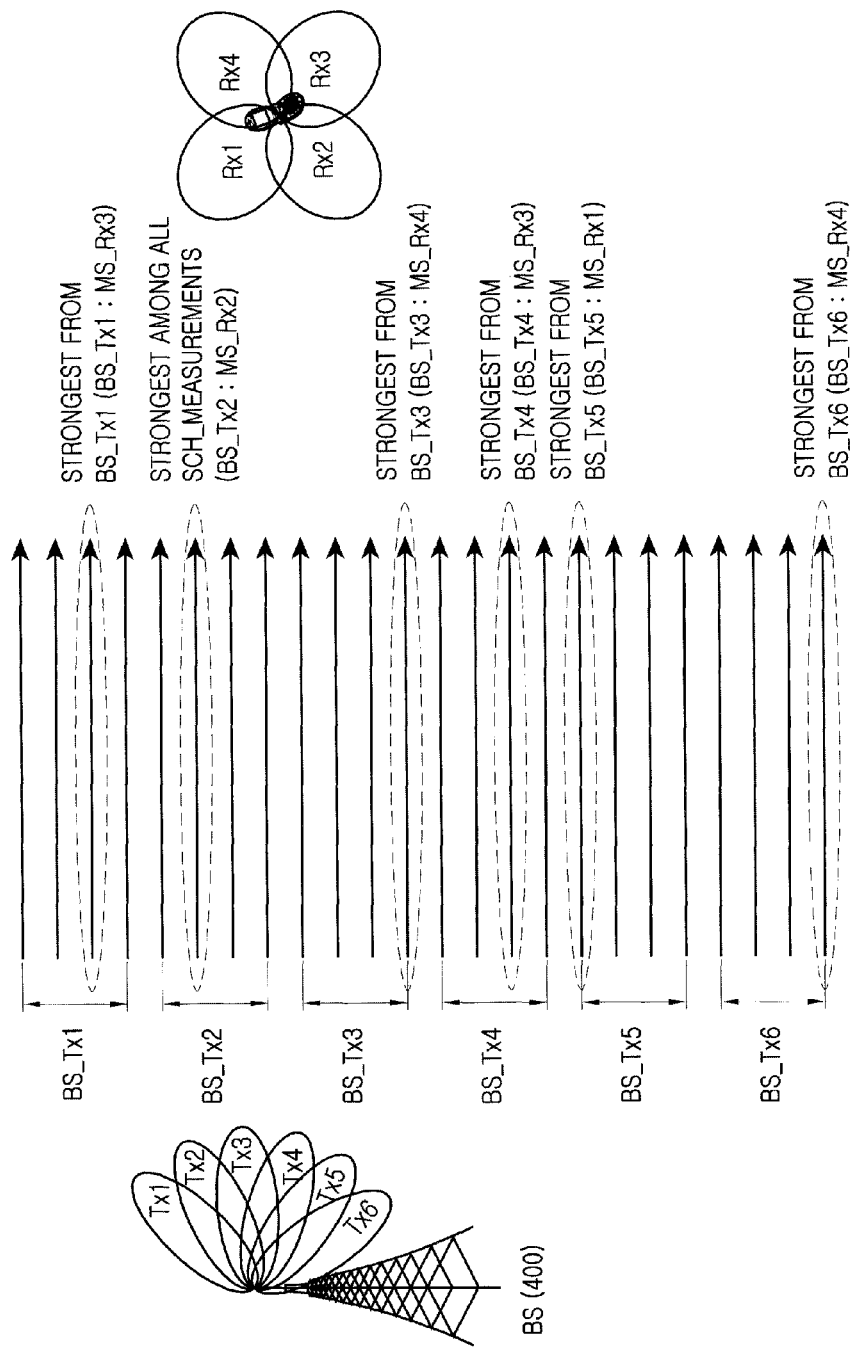
FIGS. 5A and 5B are diagrams illustrating a reception strength of a DL beam training signal in a wireless communication system supporting beamforming according to an exemplary embodiment of the present invention.
Figure 5B:
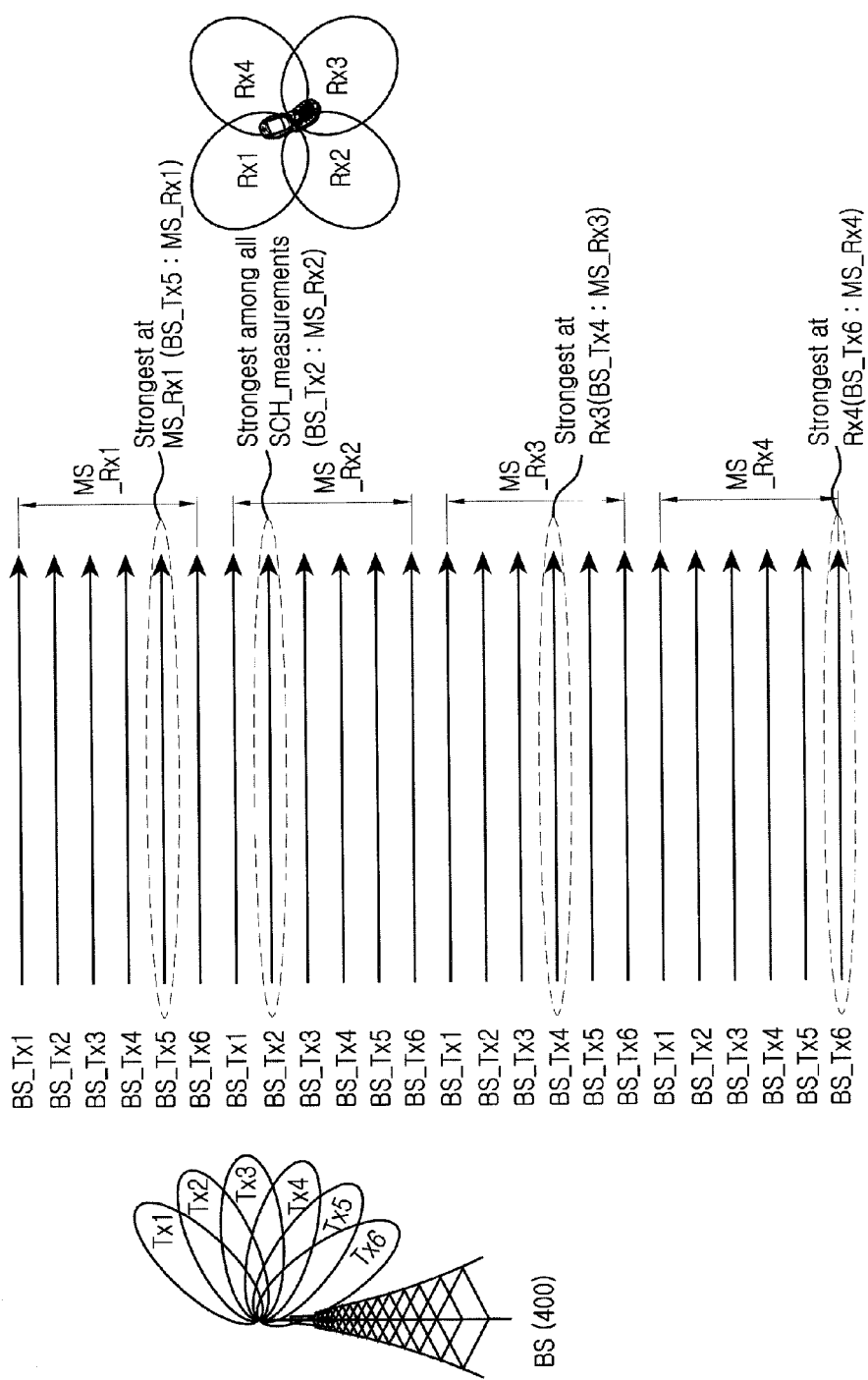

FIGS. 5A and 5B illustrate a reception strength of a DL synchronization channel in a wireless communication system supporting beamforming according to an exemplary embodiment of the present invention. FIG. 5A illustrates an optimal MS reception beam for each BS transmission beam according to an exemplary embodiment of the present invention, and FIG. 5B illustrates an optimal BS transmission beam for each MS reception beam according to another exemplary embodiment of the present invention.

Referring to FIG. 5A, a beam presented in an oval shape of a dotted line form represents an optimal reception beam of an MS 402 for each transmission beam of a BS 400. A transmission beam (BS_TX1) of the BS 400 is described as an example. The MS 402 receives four reference signals, which have been transmitted from the transmission beam (BS_TX1) of the BS 400, through four reception beams (MS_RX1, MS_RX2, MS_RX3, and MS_RX4). When a reception strength of the reference signal received through the reception beam (MS_RX3) of the MS 402 is strongest, an optimal reception beam of the MS 402 for the transmission beam (BS_TX1) of the BS 400 is the MS_RX3.

It can be appreciated that the optimal reception beam of the MS 402 for the transmission beam (BS_TX1) of the BS 400 is the MS_RX3. An optimal reception beam of the MS 402 for a transmission beam (BS_TX2) of the BS 400 is the MS_RX2. An optimal reception beam of the MS 402 for a transmission beam (BS_TX3) of the BS 400 is the MS_RX4. An optimal reception beam of the MS 402 for a transmission beam (BS_TX4) of the BS 400 is the MS_RX3. An optimal reception beam of the MS 402 for a transmission beam (BS_TX5) of the BS 400 is the MS_RX1. An optimal reception beam of the MS 402 for a transmission beam (BS_TX6) of the BS 400 is the MS_RX4. In FIG. 5A, it is assumed that, when the MS 402 receives a reference signal which has been transmitted from the transmission beam (BS_TX2) of the BS 400 through the reception beam (MS_RX2), a reception strength of the received reference signal is measured strongest.

Referring to FIG. 5B, a beam presented in an oval shape of a dotted line form represents an optimal transmission beam of a BS 400 for each reception beam of an MS 402. A reception beam (MS_RX1) of the MS 402 is described as an example. The MS 402 receives six reference signals, which have been transmitted from each of transmission beams (BS_TX1, BS_TX2, BS_TX3, BS_TX4, BS_TX5, and BS_TX6) of the BS 400, through the reception beam (MS_RX1). When a reception strength of the reference signal transmitted from the transmission beam (BS_TX5) of the BS 400 is strongest, an optimal transmission beam of the BS 400 for the reception beam (MS_RX1) of the MS 402 becomes the BS_TX5.

It can be appreciated that the optimal transmission beam of the BS 400 for the reception beam (MS_RX1) of the MS 402 is the BS_TX5. An optimal transmission beam of the BS 400 for a reception beam (MS_RX2) of the MS 402 is the BS_TX2. An optimal transmission beam of the BS 400 for a reception beam (MS_RX3) of the MS 402 is the BS_TX4. An optimal transmission beam of the BS 400 for a reception beam (MS_RX4) of the MS 402 is the BS_TX6. In FIG. 5B, it is assumed that, when the MS 402 receives a reference signal, which has been transmitted from the transmission beam (BS_TX2) of the BS 400, through the reception beam (MS_RX2), a reception strength of the received reference signal is measured strongest.

A description of a technique for, assuming a situation that signal strengths have been measured as in FIGS. 5A and 5B, selecting a transmission beam and determining a transmission power. The MS may determine a path loss for each transmission/reception beam based on the reception strength of the reference signal and the control information received from the BS, and may select an MS transmission beam for uplink based on the path loss. According to an exemplary embodiment of the present invention, the MS identifies a transmission power of the reference signal included in the control information, and determines a path loss based on a difference between the transmission power of the reference signal and the reception strength of the reference signal.

According to an exemplary embodiment of the present invention, an MS may select a transmission beam using six schemes. The transmission beam selection scheme is described below with reference to FIGS. 6A to 6F.

FIGS. 6A to 6F are diagrams illustrating an UL transmission beam selected based on a path loss of a beam training signal in a wireless communication system supporting beamforming according to an exemplary embodiment of the present invention.

Referring to FIG. 6A, the first scheme is a scheme in which the MS identifies one DL transmission/reception beam of the lowest path loss among all DL transmission/reception beams for a BS, and selects a UL transmission/reception beam corresponding to the identified transmission/reception beam of the lowest path loss. As illustrated in FIG. 6A, when a reception strength of a reference signal for a BS transmission beam (BS_TX2) and an MS reception beam (MS_RX2) is determined to be the strongest, the MS selects a UL transmission/reception beam (BS_RX2:MS_TX2) corresponding to the BS transmission beam (BS_TX2) and the MS reception beam (MS_RX2). As the MS selects the UL transmission/reception beam (BS_RX2:MS_TX2), the MS transmits a UL random access signal only for the BS reception beam (BS_RX2) through the MS transmission beam (MS_TX2), instead of transmitting the UL random access signal as many times as the number (24 times) of possible transmission/reception beams. The MS transmits the UL random access signal at a time point corresponding to the MS transmission beam (MS_TX2) and the BS reception beam (BS_RX2) within a random access channel duration.

Figure 6B:
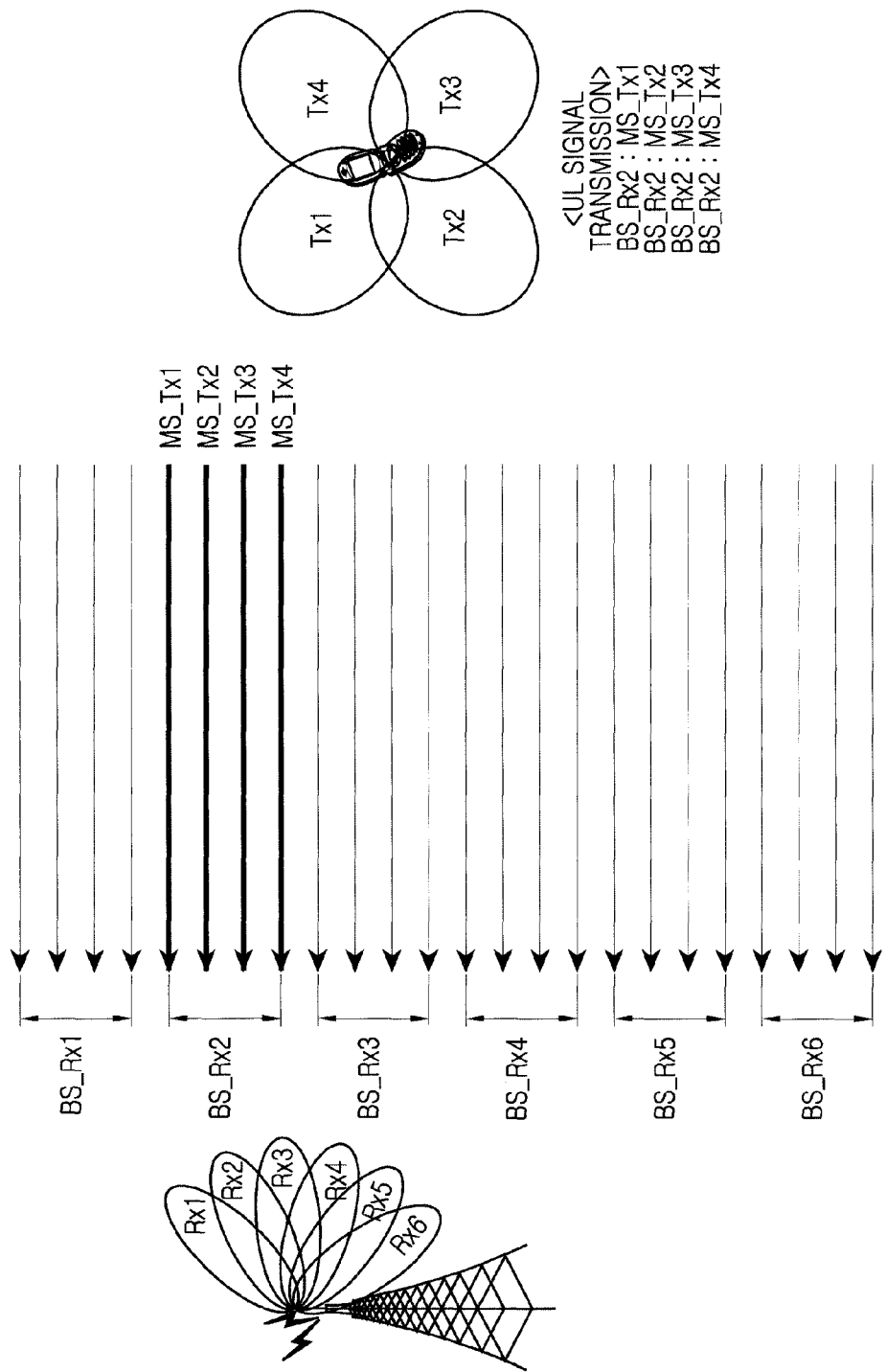

Referring to FIG. 6B, the second scheme is a scheme in which the MS identifies a BS transmission beam corresponding to one DL transmission/reception beam of the lowest path loss among all DL transmission/reception beams for a BS, and selects all MS transmission beams for a BS reception beam corresponding to the identified BS transmission beam. As illustrated in FIG. 6B, when a reception strength of a reference signal for a BS transmission beam (BS_TX2) and an MS reception beam (MS_RX2) is determined to be the strongest, the MS selects all UL transmission/reception beams (BS_RX2:MS_TX1, BS_RX2:MS_TX2, BS_RX2:MS_TX3, BS_RX2:MS_TX4) for a BS reception beam (BS_RX2) corresponding to the BS transmission beam (BS_TX2). The MS changes its transmission beams (MS_TX1, MS_TX2, MS_TX3, and MS_TX4) at a time point corresponding to the BS reception beam (BS_RX2) within a random access channel duration while transmitting a random access signal for the BS reception beam (BS_RX2).

Figure 6C:
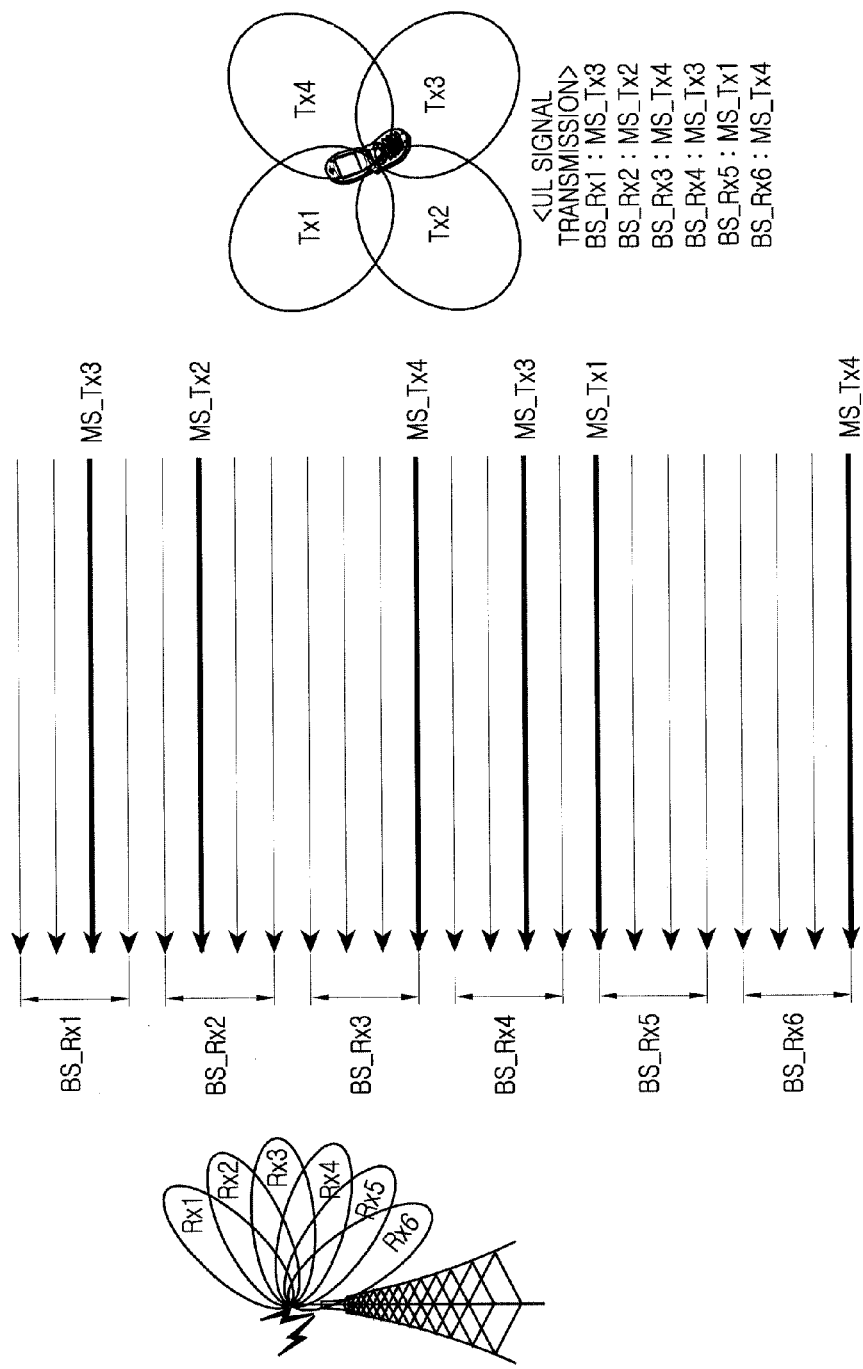

Referring to FIG. 6C, the third scheme is a scheme in which the MS identifies an MS reception beam of the lowest path loss by BS transmission beam, and selects UL transmission/reception beams corresponding to the identified MS reception beam. The third scheme is a scheme of selecting an MS transmission beam having optimal performance by BS reception beam, and transmitting a beam training signal. For example, as illustrated in FIG. 5A, when reception strengths of reference signals are measured, the MS determines optimal MS reception beams (BS_TX1:MS_RX3, BS_TX2:MS_RX2, BS_TX3:MS_RX4, BS_TX4:MS_RX3, BS_TX5:MS_RX1, and BS_TX6:MS_RX4) by BS transmission beam. As illustrated in FIG. 6C, the MS selects corresponding UL transmission/reception beams (BS_RX1:MS_TX3, BS_RX2:MS_TX2, BS_RX3:MS_TX4, BS_RX4:MS_TX3, BS_RX5:MS_TX1, and BS_RX6:MS_TX4). The MS changes its transmission beams according to the selected UL transmission/reception beams at time points corresponding to the selected UL transmission/reception beams within a random access channel duration while transmitting a random access signal for each BS reception beam.

Figure 6D:
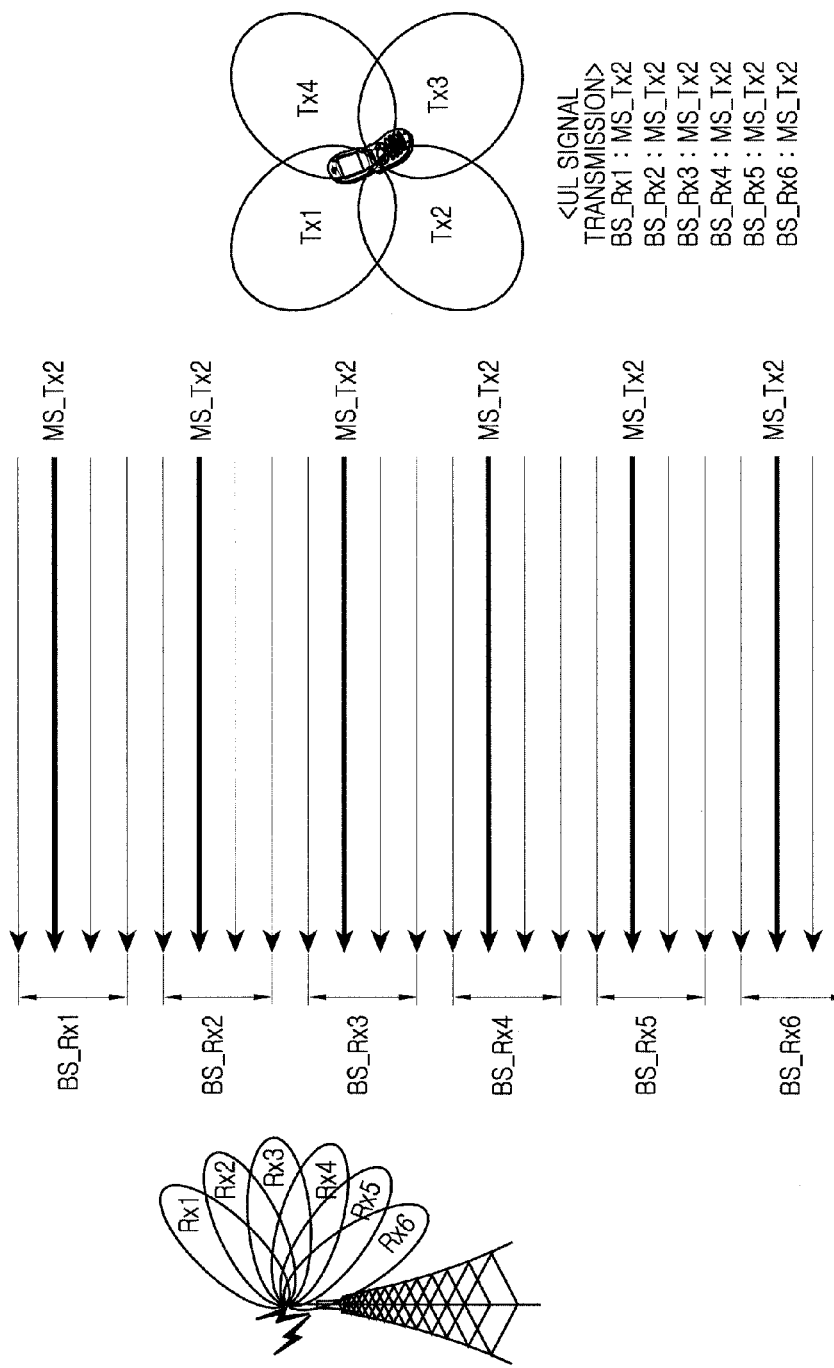

Referring to FIG. 6D, the fourth scheme is a scheme in which the MS identifies an MS reception beam corresponding to one DL transmission/reception beam of the lowest path loss among all DL transmission/reception beams for a BS, and selects all BS reception beams for an MS transmission beam corresponding to the MS reception beam. For example, as illustrated in FIG. 5B, when a reception strength of a reference signal for a BS transmission beam (BS_TX2) and an MS reception beam (MS_RX2) is determined to be the strongest, the MS identifies an MS transmission beam (MS_TX2) corresponding to the MS reception beam (MS_RX2). Then, as illustrated in FIG. 6D, the MS selects all UL transmission/reception beams (BS_RX1:MS_TX2, BS_RX2:MS_TX2, BS_RX3:MS_TX2, BS_RX4:MS_TX2, BS_RX5:MS_TX2, and BS_RX6:MS_TX2) for the MS transmission beam (MS_TX2). The MS transmits a random access signal for each of the BS reception beams through the MS transmission beam (MS_TX2) at a time point corresponding to the MS transmission beam (MS_TX2) within a random access channel duration.

Figure 6E:
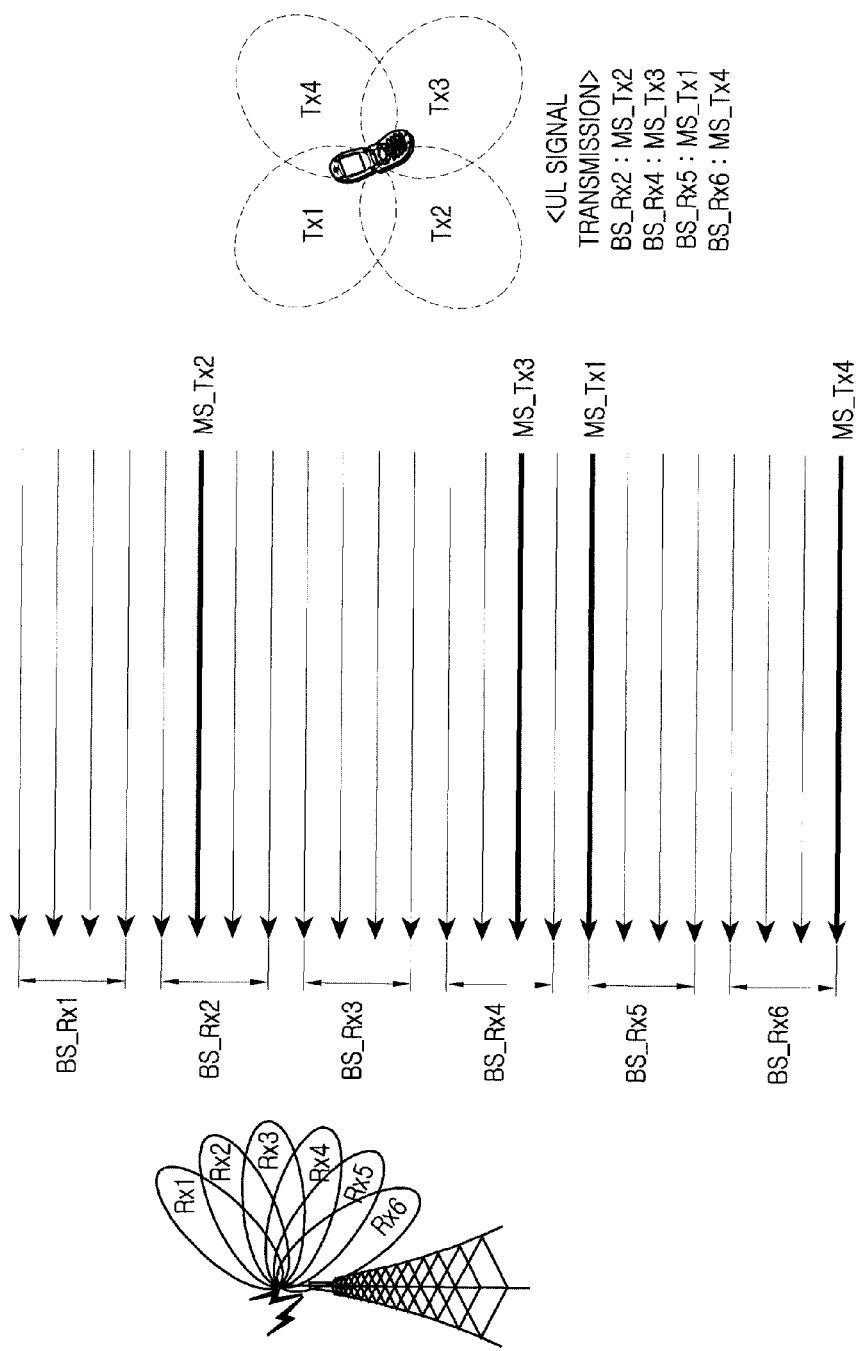

Referring to FIG. 6E, the fifth scheme is a scheme in which the MS identifies a BS transmission beam of the lowest path loss, and selects UL transmission/reception beams corresponding to the identified BS transmission beam of the lowest path loss. The fifth scheme is a scheme of selecting a BS reception beam having optimal performance by MS transmission beam and transmitting a beam training signal. For example, as illustrated in FIG. 5B, when reception strengths of reference signals are measured, the MS selects optimal BS transmission beams (BS_TX5:MS_RX1, BS_TX2:MS_RX2, BS_TX4:MS_RX3, and BS_TX6:MS_RX4) by MS reception beam. Then, as illustrated in FIG. 6E, the MS selects corresponding UL transmission/reception beams (BS_RX2:MS_TX2, BS_RX4:MS_TX3, BS_RX5:MS_TX1, and BS_RX6:MS_TX4). The MS changes its transmission beams according to the selected UL transmission/reception beams at time points corresponding to the selected UL transmission/reception beams within a random access channel duration while transmitting a random access signal for each BS reception beam.

Referring to FIG. 6F, the sixth scheme is a scheme in which the MS transmits beam training signals using all UL transmission/reception beams for a BS. As illustrated in FIG. 6F, the MS transmits the beam training signals using the all UL transmission/reception beams for the BS.

As described above, after an MS selects a transmission beam, the MS may determine a transmission power of the transmission beam. The MS determines the transmission power of the transmission beam using at least one path loss values among path loss values for all transmission/reception beams, a reception power target value included in control information from a BS, a UL maximal transmission power, a UL transmission power adjustment value, and other UL power control values. For example, the MS may use, as the transmission power, a value adding up a specific path loss value and target reception power and other power control values. According to an exemplary embodiment of the present invention, the MS may identically determine transmission power of selected one or more transmission/reception beams, by using a path loss value for the selected transmission/reception beam as the path loss value for determining the transmission power, or by using a maximal path loss value or a minimal path loss value among path loss values for the selected one or more transmission/reception beams as the path loss value for determining the transmission power. The MS may also use a minimal path loss value or a maximal path loss value among path loss values for transmission/reception beams having the same UL reception beam as a selected transmission/reception beam, as the path loss value for determining the transmission power. The MS may determine the transmission power using a minimal path loss value or a maximal path loss value among path loss values for the whole transmission/reception beam.

In the first scheme, when selecting a transmission/reception beam of the lowest path loss among all transmission/reception beams, the MS may set a transmission power of the selected transmission/reception beam using a path loss value of the selected transmission/reception beam. The path loss value for the selected transmission/reception beam represents a path loss value of a reference signal received from a corresponding DL transmission/reception beam. As illustrated in FIG. 6A, when the MS selects a UL transmission/reception beam (BS_RX2:MS_TX2), the MS may set a transmission power of the selected UL transmission/reception beam (BS_RX2:MS_TX2) using a path loss value for the selected UL transmission/reception beam (BS_RX2:MS_TX2) (i.e., a path loss value of a DL transmission/reception beam (BS_TX2:MS_RX2)).

In the second scheme, when selecting a transmission/reception beam to transmit a signal only for a specific BS reception beam, the MS may determine may determine a transmission power of the selected transmission/reception beam using a minimal path loss value or a maximal path loss value among path loss values for the selected transmission/reception beam. The path loss value for the selected transmission/reception beam represents a path loss value of a reference signal received from a corresponding DL transmission/reception beam. For example, a path loss value for a UL transmission/reception beam (BS_RX2:MS_TX3) represents a path loss value of a reference signal received from a corresponding DL transmission/reception beam (BS_TX2:MS_RX3).

As illustrated in FIG. 6B, when the MS selects UL transmission/reception beams (BS_RX2:MS_TX1, BS_RX2:MS_TX2, BS_RX2:MS_TX3, and BS_RX2:MS_TX4) for a BS reception beam (BS_RX2), the MS may determine transmission power of the selected UL transmission/reception beams (BS_RX2:MS_TX1, BS_RX2:MS_TX2, BS_RX2:MS_TX3, and BS_RX2:MS_TX4) using a maximal path loss value (e.g., a path loss value of a DL transmission/reception beam (BS_TX2:MS_RX4)) or a minimal path loss value (e.g., a path loss value of a DL transmission/reception beam (BS_TX2:MS_RX2)) among path loss values for the UL transmission/reception beams (BS_RX2:MS_TX1, BS_RX2:MS_TX2, BS_RX2:MS_TX3, and BS_RX2:MS_TX4). In the second scheme, when selecting a transmission/reception beam to transmit a signal only for a specific BS reception beam, the MS may determine a transmission power of the selected transmission/reception beam using a minimal path loss value or a maximal path loss value among path loss values for all transmission/reception beams.

In the third scheme, when selecting an MS transmission beam having an optimal path loss by BS reception beam, the MS may determine a transmission power of the selected MS transmission beam using a minimal path loss value or a maximal path loss value among path loss values for the BS reception beam corresponding to the selected MS transmission beam, or may determine a transmission power of the selected MS transmission beam using a minimal path loss value or a maximal path loss value among path loss values for the whole reference signal. The path loss value for the BS reception beam represents a path loss value measured for reference signals that the MS has received from the BS transmission beam corresponding to the BS reception beam. For example, a path loss value for a BS reception beam (BS_RX1) represents a path loss value for reference signals, which are transmitted from a corresponding BS transmission beam (BS_TX1) and are received to respective MS reception beams.

As illustrated in FIG. 6C, the MS may set a transmission power of a UL transmission/reception beam direction (BS_RX1:MS_TX3) using a minimal path loss value or a maximal path loss value among path loss values for a DL BS transmission beam (BS_TX1) (e.g., path loss values of BS_TX1:MS_RX1, BS_TX1:MS_RX2, BS_TX1:MS_RX3, and BS_TX1:MS_RX4), and may set a transmission power of a UL transmission/reception beam direction (BS_RX2:MS_TX2) using a minimal path loss value or a maximal path loss value among path loss values for a DL BS transmission beam (BS_TX2) (e.g., path loss values of BS_TX2:MS_RX1, BS_TX2:MS_RX2, BS_TX2:MS_RX3, and BS_TX2:MS_RX4). The MS may set transmission power of all selected transmission/reception beams using a minimal path loss value or a maximal path loss value among path loss values for all transmission/reception beams.

In the fourth scheme, when selecting a transmission/reception beam to transmit a signal for a specific MS transmission beam, the MS may determine a transmission power of the selected transmission/reception beam using a minimal path loss value or a maximal path loss value among path loss values for the selected transmission/reception beam. The path loss value for the selected transmission/reception beam represents a path loss value of a reference signal received from a corresponding DL transmission/reception beam. For example, a path loss value for a UL transmission/reception beam (BS_RX2:MS_TX2) represents a path loss value of a reference signal received from a corresponding DL transmission/reception beam (BS_TX2:MS_RX2).

As illustrated in FIG. 6D, when selecting all UL transmission/reception beams (BS_RX1:MS_TX2, BS_RX2: MS_TX2, BS_RX3:MS_TX2, BS_RX4:MS_TX2, BS_RX5:MS_TX2, and BS_RX6:MS_TX2) for an MS transmission beam (MS_TX2), the MS may determine transmission power of the UL transmission/reception beams (BS_RX1:MS_TX2, BS_RX2:MS_TX2, BS_RX3: MS_TX2, BS_RX4:MS_TX2, BS_RX5:MS_TX2, and BS_RX6:MS_TX2) using a maximal path loss value (e.g. a path loss value of BS_TX2:MS_RX2) or a minimal path loss value (e.g., a path loss value of BS_TX5:MS_RX2) among path loss values of DL transmission/reception beams (BS_TX1:MS_RX2, BS_TX2:MS_RX2, BS_TX3: MS_RX2, BS_TX4:MS_RX2, BS_TX5:MS_RX2, and BS_TX6:MS_RX2) corresponding to the selected UL transmission/reception beams (BS_RX1:MS_TX2, BS_RX2: MS_TX2, BS_RX3:MS_TX2, BS_RX4:MS_TX2, BS_RX5:MS_TX2, and BS_RX6:MS_TX2). When selecting a transmission/reception beam to transmit a signal only for a specific MS transmission beam, the MS may determine a transmission power of the transmission/reception beam using a minimal path loss value or a maximal path loss value among path loss values for all transmission/reception beams.

In the fifth scheme, when selecting a BS reception beam having an optimal path loss by MS transmission beam, the MS may determine a transmission power of the selected BS reception beam using a minimal path loss value or a maximal path loss value among path loss values for selected respective transmission/reception beams, or may determine a transmission power of the selected BS reception beam using a minimal path loss value or a minimal path loss value among path loss values for the whole reference signal. As illustrated in FIG. 6E, when selecting four UL transmission/reception beams (BS_RX2:MS_TX2, BS_RX4:MS_TX3, BS_RX5: MS_TX1, and BS_RX6:MS_TX4), the MS may determine transmission power of the selected four UL transmission/reception beam directions (BS_RX2:MS_TX2, BS_RX4: MS_TX3, BS_RX5:MS_TX1, and BS_RX6:MS_TX4) using a minimal path loss value or a maximal path loss value among path loss values of DL transmission/reception beams (e.g., path loss values of BS_TX2:MS_RX2, BS_TX4: MS_RX3, BS_TX5:MS_RX1, and BS_TX6:MS_RX4) corresponding to the selected UL transmission/reception beams (BS_RX2:MS_TX2, BS_RX4:MS_TX3, BS_RX5: MS_TX1, and BS_RX6:MS_TX4).

In the sixth scheme, when using all UL transmission/reception beams for a BS, the MS may determine transmission power of the UL transmission/reception beams using path loss values of DL transmission/reception beams corresponding to the UL transmission/reception beams, or may determine transmission power of the UL transmission/reception beams using a minimal path loss value or a maximal path loss value among path loss values for the whole reference signal.

Figure 7:
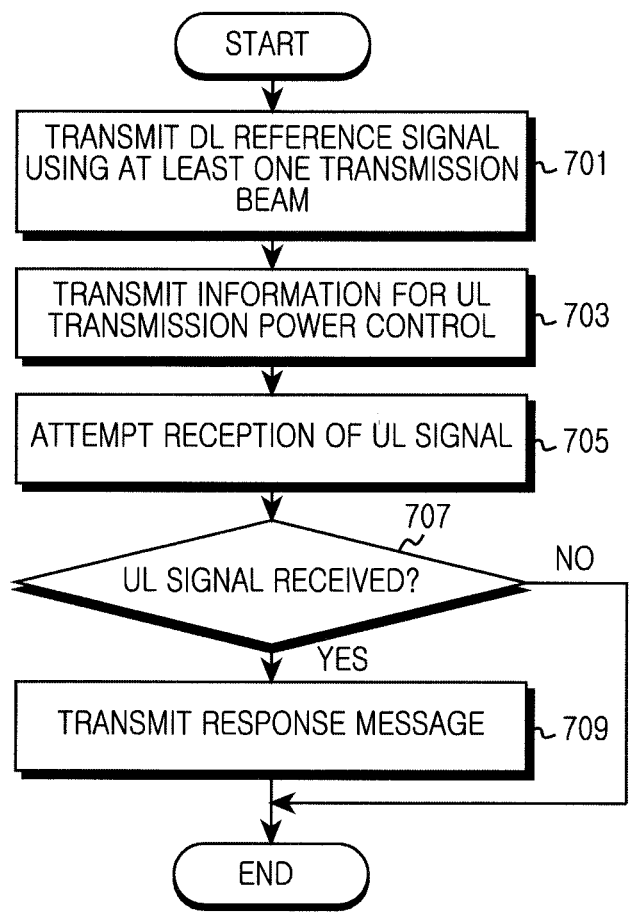
FIG. 7 is a flowchart illustrating a procedure in which a Base Station (BS) receives a UL random access in a wireless communication system supporting beamforming according to an exemplary embodiment of the present invention.

FIG. 7 illustrates a procedure in which a BS receives an uplink random access in a wireless communication system supporting beamforming according to an exemplary embodiment of the present invention.

Referring to FIG. 7, in step 701, the BS transmits DL reference signals for beam training to an MS using a plurality of transmission beams having different directivity. The BS transmits the DL reference signal through the each transmission beam as many times as the number of times corresponding to the number of MS reception beams. For example, when a BS transmission beam is 'M' in number, and an MS reception beam is 'N' in number, the BS transmits a DL reference signal 'N' times through each of the 'M' transmission beams, thereby transmitting the DL reference signal (M×N) times. Each reference signal includes information about the BS transmission beam having transmitted the reference signal.

In step 703, the BS transmits control information for controlling power for uplink through a broadcast channel or unicast signaling. The control information includes UL power control information such as a transmission power of the reference signal, a target reception power of a UL signal, a UL maximal transmission power, a UL transmission power adjustment value, a response wait time and the like.

In step 705, the BS attempts reception of a UL signal using a plurality of reception beams having different directivity. In step 707, the BS determines whether the UL signal is received from the MS. The BS changes its reception beams according to a preset scheme while attempting the reception of the UL signal, thereby being capable of receiving the UL signal from a transmission beam, which the MS has selected based on a path loss, among different transmission/reception beams formed between the BS and the MS. In an exemplary embodiment of the present invention, the UL signal may be a random access signal. The BS determines whether the UL signal is received, by combining UL signals received at different transmission/reception beams.

When it is determined in step 707 that the UL signal is received from the MS, the BS transmits a response signal to the MS in step 709, which indicates that the BS has received the UL signal from the MS. When a plurality of UL signals are received from the MS, the BS may determine a BS reception beam for UL signal reception after random access and an MS transmission beam, based on a reception strength of the UL signal, and may present, in the response signal, information about the determined MS transmission beam. The BS may determine a plurality of UL transmission/reception beams, for the sake of UL signal reception after random access, based on the reception strength of the UL signal. According to this, the BS may combine and process UL signals received through the plurality of UL transmission/reception beams after random access and, accordingly, may improve communication efficiency.

In contrast, when it is determined in step 707 that the UL signal is not received from the MS, the BS terminates the procedure.

Figure 8:
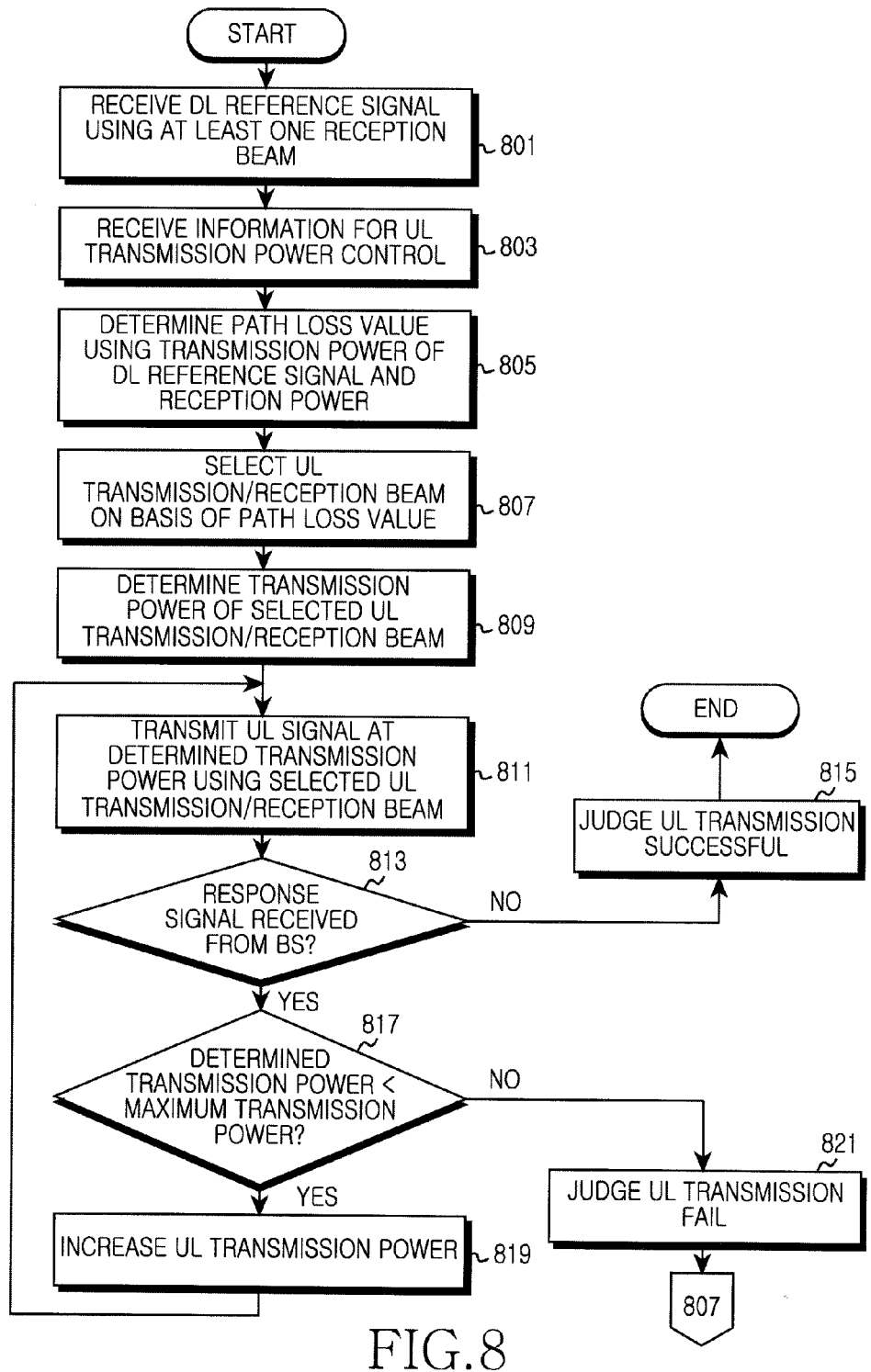
FIG. 8 is a flowchart illustrating a UL random access procedure of a Mobile Station (MS) in a wireless communication system supporting beamforming according to an exemplary embodiment of the present invention.

FIG. 8 illustrates an uplink random access procedure of an MS in a wireless communication system supporting beamforming according to an exemplary embodiment of the present invention.

Referring to FIG. 8, in step 801, the MS receives DL reference signals from a BS using a plurality of reception beams having different directivity. The MS changes the reception beams according to a preset scheme while receiving the DL reference signals from the BS. For example, when a BS transmission beam is 'M' in number, and an MS reception beam is 'N' in number, the MS receives a reference signal, which has been received from the 'M' transmission beams, through each of the 'N' reception beams 'M' times, thereby attempting to receive the reference signal (M×N) times. Each reference signal includes information about the BS transmission beam having transmitted the reference signal.

In step 803, the MS receives control information for controlling UL transmission power from the BS. The control information may be received through a broadcast channel or may be received through unicast signaling. The control information includes UL power control information such as a transmission power of the reference signal, a target reception power of a UL signal, a UL maximal transmission power, a UL transmission power adjustment value, a response wait time and the like.

In step 805, the MS determines a path loss for each reference signal, which is received through each of a plurality of DL transmission/reception beams, using a difference between reception strengths of the DL reference signals received through the plurality of DL transmission/reception beams and the transmission power of the reference signal included in the control information. In step 807, the MS selects a UL transmission beam to transmit a UL signal to the BS based on the determined path loss.

The MS may select the UL transmission beam according to any one of the six schemes described above. According to the first scheme, the MS may select one UL transmission/reception beam of the lowest path loss among all UL transmission/reception beams for the BS. According to the second scheme, the MS may identify a BS transmission beam corresponding to one DL transmission/reception beam of the lowest path loss among all DL transmission/reception beams for the BS, and select all MS transmission beams for a BS reception beam corresponding to the BS transmission beam. According to the third scheme, the MS may identify an MS reception beam of the lowest path loss by BS transmission beam, and select UL transmission/reception beams corresponding to the identified MS reception beam of the lowest path loss. According to the fourth scheme, the MS may identify an MS reception beam corresponding to one DL transmission/reception beam of the lowest path loss among all DL transmission/reception beams for the BS, select an MS transmission beam corresponding to the MS reception beam, and select all BS reception beams for the MS transmission beam. According to the fifth scheme, the MS may identify a BS transmission beam of the lowest path loss by MS reception beam, and select UL transmission/reception beams corresponding to the identified BS transmission beam of the lowest path loss. According to the sixth scheme, the MS may select all UL transmission/reception beams for the BS.

The MS determines a transmission power of the selected UL transmission beam in step 809. The MS determines the transmission power of the transmission beam using at least one path loss values among path loss values for the all transmission/reception beams, a reception power target value included in the control information from the BS, a UL maximal transmission power, a UL transmission power adjustment value, and other UL power control values. For example, the MS may use, as the transmission power, a value adding up a specific path loss value and target reception power and other power control values. The MS may use a path loss value for a selected transmission/reception beam as the path loss value for determining the transmission power. The MS may also use a minimal path loss value or a maximal path loss value among path loss values for transmission/reception beams having the same UL reception beam as the selected transmission/reception beam, as the path loss value for determining the transmission power. The MS may determine the transmission power using a minimal path loss value or a maximal path loss value among path loss values for the whole transmission/reception beam. The MS may determine the same transmission power of selected transmission/reception beams using a minimal path loss value or a maximal path loss value among path loss values for the selected transmission/reception beams.

In step 811, the MS transmits a UL signal, i.e., a random access signal, at the determined transmission power using the selected UL transmission/reception beam. The MS determines in step 813 whether a response signal is received from the BS. When it is determined in step 813 that the response signal is received from the BS within a preset response wait time, the MS determines in step 815 that the UL transmission has been successfully performed, and terminates the random access procedure. The MS and the BS may perform collision resolution in preparation for a case that, because a UL transmission signal of the MS and a UL transmission signal of another MS are transmitted in the same resource region and collision takes place, multiple MSs will receive the same response signal. The MS and the BS may also perform an operation related to channel establishment.

In contrast, when it is determined in step 813 that the response signal is not received from the BS within the preset response wait time, the MS determines in step 817 whether the determined transmission power is less than a preset UL maximal transmission power. When it is determined in step 817 that the determined transmission power is less than the preset UL maximal transmission power, the MS identifies the UL transmission power adjustment value in the control information in step 819, and increases the determined transmission power as much as the UL transmission power adjustment value. If the increased transmission power is greater than the preset UL maximal transmission power, the MS sets the preset UL maximal transmission power as UL transmission power of the MS. The MS returns to step 811 or step 801 (not shown) and performs the subsequent steps for UL signal retransmission. If the MS returns to step 801 and again selects a transmission/reception beam used for UL signal retransmission, in step 807, the MS can finally select a UL transmission/reception beam considering history information of the newly selected transmission/reception beams and transmission/reception beams used for previous UL signal transmission or retransmission through step 801 to step 807. A detailed method of finally selecting a transmission/reception beam in step 807 can be a method of selecting a transmission/reception beam that is the closest to direction averaging the directions of the transmission/reception beam newly selected in step 807 and the transmission/reception beams used for the previous UL signal transmission. A method of averaging the directions of the transmission/reception beams can be separately applied to each of a transmission beam and a reception beam. That is, the MS can select, as a final transmission beam, a transmission beam that is the closest to direction averaging the directions of the transmission beam newly selected in step 807 and the transmission beams used for the previous UL signal transmission, and can select, as a final reception beam, a reception beam that is the closest to direction averaging the directions of the UL reception beam newly selected in step 807 and the reception beams used for the previous UL signal reception.

Another method of finally selecting a transmission/reception beam in step 807 can be a method of selecting a transmission/reception beam that is the closest to direction weight-averaging the directions of the transmission/reception beam newly selected in step 807 and the transmission/reception beams used for the previous UL signal transmission. A weight averaging method used in step 807 can be a method of multiplying the direction of a newly selected transmission/reception beam by constant '1', and multiplying more recently used or selected transmission/reception beams among the respective transmission/reception beam used for the UL signal transmission by a constant closer to '1' and greater than '0' and averaging the multiplication results. The method of weight-averaging the directions of the transmission/reception beams can be separately applied to each of a transmission beam and a reception beam.

In contrast, when it is determined in step 817 that the determined transmission power is equal to or is greater than the UL maximal transmission power, the MS determines in step 821 that the UL signal transmission fails and, after waiting for a predetermined time, the MS returns to step 807. According to another exemplary embodiments of the present invention, if the number of times of the UL signal retransmission is less than a preset maximal number of times of retransmission, the MS may perform the UL signal retransmission until the number of times of the UL signal retransmission is equal to the maximal number of retransmission.

Figure 9:
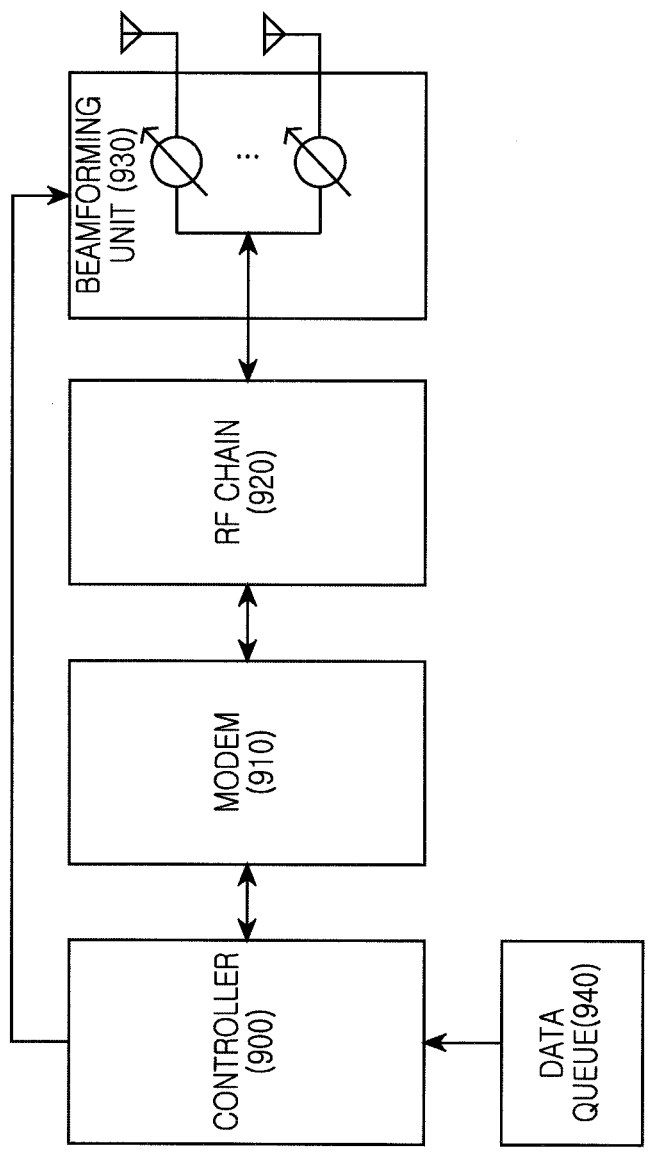
FIG. 9 is a block diagram illustrating a BS in a wireless communication system supporting beamforming according to an exemplary embodiment of the present invention.

FIG. 9 is a block diagram illustrating a construction of a BS in a wireless communication system supporting beamforming according to an exemplary embodiment of the present invention.

Referring to FIG. 9, the BS includes a controller 900, a modem 910, a Radio Frequency (RF) chain 920, a beamforming unit 930, and a data queue 940. Although not shown in the drawings to improve clarity, the BS may include additional components.

The controller 900 controls and processes the general operation of the BS. Particularly, the controller 900 controls and processes a function for controlling the beamforming unit 930 and transmitting/receiving signals with an MS through a plurality of transmission/reception beams having different directivity.

The controller 900 controls and processes a function for controlling the beamforming unit 930 and transmitting reference signals for DL beam training to the MS through the plurality of transmission beams having the different directivity, and receiving UL beam training signals, i.e., random access signals, from the MS through the plurality of reception beams having the different directivity. The reference signal includes information about the BS transmission beam having transmitted the reference signal. The controller 900 controls the beamforming unit 930 and changes a reception beam according to a preset scheme while attempting reception of a UL signal, thereby being capable of receiving the UL signal from a transmission beam, which the MS has selected based on a path loss, among different transmission/reception beams formed between the BS and the MS.

The controller 900 also controls and processes a function for transmitting control information for controlling a UL transmission power to the MS. The control information may be transmitted through a broadcast channel or may be transmitted through unicast signaling. The control information includes a reference signal transmission power of the BS, a target reception power, a UL maximal transmission power, a UL transmission power adjustment value, a response wait time and the like. The controller 900 controls and processes a function for, when a plurality of UL signals having different directivity are received from an MS, measuring reception strengths of the UL signals, determining an MS transmission beam and a BS reception beam for the UL signal reception after random access based on the measured reception strengths, and transmitting information about this to the MS.

The modem 910 converts between a baseband signal and a bit stream according to the physical layer standard of the system. For example, according to an Orthogonal Frequency Division Multiplexing (OFDM) scheme, at data transmission, the modem 910 creates complex symbols by encoding and modulating a transmission bit stream, maps the complex symbols to subcarriers, and then constructs OFDM symbols through Inverse Fast Fourier Transform (IFFT) operation and Cyclic Prefix (CP) insertion. At data reception, the modem 910 divides a baseband signal in the unit of OFDM symbol, restores signals mapped to subcarriers through Fast Fourier Transform (FFT) operation, and restores a reception bit stream through demodulation and decoding.

The RF chain 920 converts a baseband digital stream provided from the modem 910 into an RF band analog signal. The RF chain 920 may include an amplifier, a mixer, an oscillator, a Digital to Analog Converter (DAC), an Analog to Digital Converter (ADC), a filter, and the like. In FIG. 9, only one RF chain 920 is illustrated, but the BS may include a plurality of RF chains according to an exemplary embodiment of the present invention.

The beamforming unit 930 includes a plurality of constituent elements, and each constituent element adjusts a phase and magnitude of a signal in each antenna path. The beamforming unit 930 adjusts a phase and magnitude of a signal transmitted to each antenna path according to a phase and magnitude value of a signal by antenna provided from the controller 900. In FIG. 9, a path is illustrated one per antenna and even constituent element is illustrated one per antenna in each path, but a transmission path and a reception path may be constructed separately for each antenna according to another exemplary embodiment of the present invention. In this case, constituent elements of the beamforming unit 930 may exist two per antenna.

The data queue 940 stores data received from an upper network node, by MS or service.

FIG. 9 shows the block construction of the BS forming a plurality of transmission/reception beams through analog beamforming. According to another exemplary embodiment of the present invention, the BS may form the plurality of transmission/reception beams through at least one of digital beamforming, beamforming physically moving an antenna, antennas corresponding to respective beam directions previously defined, antenna bundles or antenna arrays. In the case of the digital beamforming, the beamforming unit 930 may be omitted, and the controller 900 multiplies a transmission signal by a codebook and performs beamforming, thereby being capable of supporting the plurality of transmission/reception beams. The transmission/reception beams include not only an antenna physically fixing a beam but also all beams of narrow widths formed through various schemes such as digital beamforming and analog beamforming schemes and the like.

Figure 10:
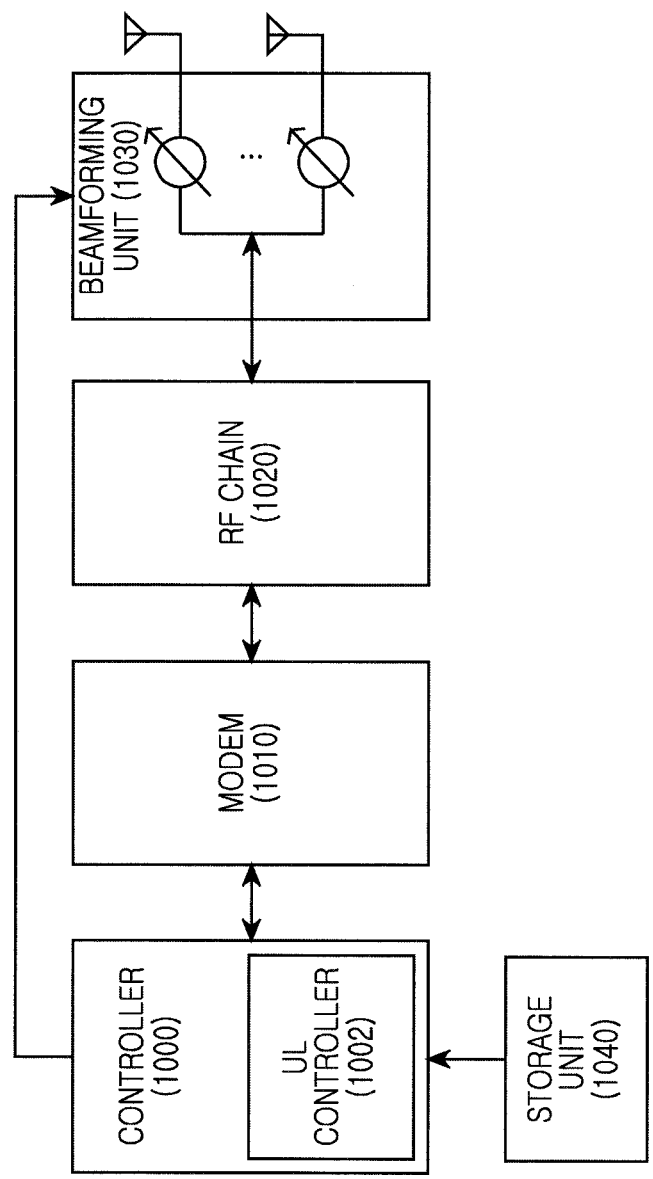
FIG. 10 is a block diagram illustrating an MS in a wireless communication system supporting beamforming according to an exemplary embodiment of the present invention.

FIG. 10 is a block diagram illustrating a construction of an MS in a wireless communication system supporting beamforming according to an exemplary embodiment of the present invention.

Referring to FIG. 10, the MS includes a controller 1000, a modem 1010, an RF chain 1020, a beamforming unit 1030, and a storage unit 1040. Although not shown in the drawings to improve clarity, the MS may also include additional units, The controller 1000 controls and processes the general operation of the MS. The controller 1000 controls and processes a function for controlling the beamforming unit 1030 and transmitting/receiving signals with a BS through a plurality of transmission/reception beams having different directivity.

The controller 1000 controls and processes a function for controlling the beamforming unit 1030 and receiving reference signals for DL beam training from the BS through the plurality of reception beams having the different directivity, and transmitting UL random access signals to the BS through the plurality of transmission beams having the different directivity. The reference signal includes information about the BS transmission beam having transmitted the reference signal. The controller 1000 also controls and processes a function for receiving control information for controlling a UL transmission power from the BS. The control information may be received through a broadcast channel or may be received through unicast signaling. The control information includes a reference signal transmission power of the BS, a target reception power, a UL maximal transmission power, a UL transmission power adjustment value, a response wait time and the like.

The controller 1000 controls and processes a function for, when a plurality of reference signals having different directivity are received from the BS through a UL controller 1002, measuring reception strengths of the reference signals, measuring a path loss for each transmission/reception beam based on the measured reception strengths, selecting a transmission/reception beam for UL signal transmission based on the measured path loss, and determining a transmission power of the selected transmission/reception beam. The UL controller 1002 may select a transmission/reception beam for UL signal transmission using any one of the six schemes illustrated in FIGS. 6A to 6D. The UL controller 1002 determines a transmission power of a transmission beam using at least one or more path loss values among path loss values for all transmission/reception beams with the BS, a reception power target value of the BS, a UL maximal transmission power, a UL transmission power adjustment value, and other UL power control values.

The modem 1010 converts between a baseband signal and a bit stream according to the physical layer standard of the system. For example, according to an OFDM scheme, at data transmission, the modem 1010 creates complex symbols by encoding and modulating a transmission bit stream, maps the complex symbols to subcarriers, and then constructs OFDM symbols through IFFT operation and CP insertion. At data reception, the modem 1010 divides a baseband signal in the unit of OFDM symbol, restores signals mapped to subcarriers through FFT operation, and restores a reception bit stream through demodulation and decoding.

The RF chain 1020 converts a baseband digital stream provided from the modem 1010 into an RF band analog signal. The RF chain 1020 may include an amplifier, a mixer, an oscillator, a DAC, an ADC, a filter, and the like. In FIG. 10, only one RF chain 1020 is illustrated, but the MS may include a plurality of RF chains according to an exemplary embodiment of the present invention.

The beamforming unit 1030 includes a plurality of constituent elements, and each constituent element adjusts a phase and magnitude of a signal in each antenna path. The beamforming unit 1030 adjusts a phase and magnitude of a signal transmitted to each antenna path according to a phase and magnitude value of a signal by antenna provided from the controller 1000, thereby being able to form a transmission/reception beam having different directivity. In FIG. 10, a path is illustrated one per antenna and every constituent element is illustrated one per antenna in each path, but a transmission path and a reception path may be constructed separately for each antenna according to another exemplary embodiment of the present invention. In this case, constituent elements of the beamforming unit 1030 may exist two per antenna.

The storage unit 1040 stores various programs and data necessary for an operation of the MS, and stores control information received from the BS.

In FIG. 10, the block construction of the MS forms a plurality of transmission/reception beams through analog beamforming. According to another exemplary embodiment of the present invention, the MS may form the plurality of transmission/reception beams through at least one of digital beamforming, beamforming physically moving an antenna, antennas corresponding to respective beam directions previously defined, antenna bundles or antenna arrays. In the case of the digital beamforming, the beamforming unit 1030 may be omitted, and the controller 1000 multiplies a transmission signal by a codebook and performs beamforming, thereby being capable of supporting the plurality of transmission/reception beams. The transmission/reception beams mentioned in the present invention is meaning including not only an antenna physically fixing a beam but also all beams of narrow widths formed through various schemes such as digital beamforming and analog beamforming schemes and the like.

As described above, exemplary embodiments of the present invention have an effect of, based on a DL path loss for a different transmission/reception beam direction, determining a UL MS transmission beam and a transmission power, and transmitting a UL random access signal at the determined transmission power through the determined MS transmission beam, thereby being able to decrease the consumption of energy resulting from a random access procedure, and improve the probability of success of random access signal transmission.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of a mobile station (MS) for uplink (UL) control in a wireless communication system supporting beamforming, the method comprising:
receiving a plurality of downlink (DL) reference signals from a plurality of transmission beams corresponding to at least one antenna of a base station (BS) using a plurality of reception beams corresponding to at least one antenna of the MS;
measuring a path loss value each of the reference signals based on a reception signal strength of each of the plurality of DL reference signals;
selecting at least one transmission beam of the MS for uplink based on the path loss value measured for each of the plurality of DL reference signals; and
transmitting at least one UL signal used for selecting at least one reception beam of the BS in the BS, to a BS through the selected at least one transmission beam among transmission beams of the MS.

2. The method of claim 1, wherein the selecting of the at least one transmission beam of the MS for uplink comprises:
comparing path loss values for the respective plurality of DL reference signals received through different DL transmission/reception beams; and
selecting a UL transmission/reception beam corresponding to a DL transmission/reception beam of a DL reference signal having the least path loss value.

3. The method of claim 1, wherein the selecting of the at least one transmission beam of the MS for uplink comprises:

comparing path loss values for the respective plurality of DL reference signals received through different DL transmission/reception beams;
identifying a UL reception beam corresponding to the DL transmission beam of a DL reference signal having the least path loss value; and
selecting UL transmission beams for the identified UL reception beam.

4. The method of claim 1, wherein the selecting of the at least one transmission beam of the MS for uplink comprises:
comparing path loss values for the respective plurality of DL reference signals received through different DL transmission/reception beams;
identifying a DL reference signal having the least path loss value by DL transmission beam; and
selecting a UL transmission/reception beam corresponding to a DL transmission/reception beam of the DL reference signal identified as having the least path loss value by DL transmission beam.

5. The method of claim 1, wherein the selecting of the at least one transmission beam of the MS for uplink comprises:
comparing path loss values for the respective plurality of DL reference signals received through different DL transmission/reception beams;
identifying an UL transmission beam corresponding to an DL reception beam of a DL reference signal having the least path loss value; and
selecting a plurality of UL reception beams for the identified UL transmission beam.

6. The method of claim 1, wherein the selecting of the at least one M-transmission beam of the MS for uplink comprises:
comparing path loss values for the respective plurality of DL reference signals received through different DL transmission/reception beams;
identifying a DL reference signal having the least path loss value by DL reception beam; and
selecting a UL transmission/reception beam corresponding to a DL transmission/reception beam of the DL reference signal identified as having the least path loss value by DL reception beam.

7. The method of claim 1, further comprising:
receiving control information about a UL transmission power from the BS; and
determining a transmission power of the selected transmission beam based on at least one of at least one path loss value among path loss values for DL transmission/reception beams and control information,
wherein the control information comprises at least one of a DL reference signal transmission power of the BS, a target reception power, a UL maximal transmission power, a UL transmission power adjustment value, and a response wait time, and
wherein the transmission power is determined based on at least one of a path loss value corresponding to a selected transmission/reception beam, a minimal or maximal path loss value among path loss values for selected transmission/reception beams, a minimal or maximal path loss value among path loss values for transmission/reception beams having the same UL reception beam as a selected transmission/reception beam, and a minimal or maximal path loss value among path loss values for transmission/reception beams.

8. The method of claim 1,
wherein the UL signal is transmitted in order to determining reception beam of the BS, and
wherein the UL signal comprises random access signal.

9. The method of claim 1, wherein the measuring of the path loss value for each of the plurality of reference signals based on a reception signal strength of each of the plurality of DL reference signals comprises:
receiving control information from the BS; and
measuring the path loss value based on the received control signal and the reception signal strength of each of the plurality of DL reference signals.

10. A method of a base station (BS) for uplink (UL) control in a wireless communication system supporting beamforming, the method comprising:
transmitting downlink (DL) reference signals to a plurality of reception beams corresponding to at least one antenna of mobile station (MS), using a plurality of transmission beams corresponding to at least one antenna of the BS;
receiving at least one UL signal from at least one transmission beam, which an MS has selected based on a path loss value, among transmission beams of the MS; and
selecting a reception beam of the BS among at least one reception beam which the UL signal is received, based on a reception strength of the received UL signal.

11. The method of claim 10, further comprising:
as a result of selecting the reception beam of the BS among at least one reception beam which the UL signal is received, based on the reception strength of the received at least one UL signal, when a plurality of reception beams are selected, coupling signals received from the selected plurality of reception beams.

12. The method of claim 10, further comprising transmitting control information,
wherein the control information comprises at least one of a DL reference signal transmission power of the BS, a target reception power, a UL maximal transmission power, a UL transmission power adjustment value, and a response wait time.

13. The method of claim 10, wherein the UL signal comprises random access signal.

14. A mobile station (MS) for uplink (UL) control in a wireless communication system supporting beamforming, the apparatus comprising:
a transceiver for transmitting and receiving a signal using at least one antenna; and
a controller for:
controlling the transceiver and receiving a plurality of downlink (DL) reference signals from a plurality of transmission beams corresponding to at least one antenna of a base station (BS), using a plurality of reception beams corresponding the at least one antenna of the MS,
measuring a path loss value for each of the plurality of reference signals, based on a reception signal strength of each of the plurality of DL reference signals,
selecting at least one transmission beam of the MS for uplink based on the path loss value measured for each of the plurality of DL reference signals, and
transmitting at least one UL signal used for selecting at least one reception beam of the BS in the BS, to a BS through the selected at least one transmission beam among transmission beams of the MS.

15. The MS of claim 14, wherein the controller compares path loss values for the respective plurality of DL reference signals received through different DL transmission/reception beams, and selects a UL transmission/reception beam corresponding to a DL transmission/reception beam of a DL reference signal having the least path loss value.

16. The MS of claim 14, wherein the controller compares path loss values for the respective plurality of DL reference signals received through different DL transmission/reception beams, identifies a UL reception beam corresponding to the DL transmission beam of a DL reference signal having the least path loss value, and selects DL transmission beams for the identified UL reception beam.

17. The MS of claim 14, wherein the controller compares path loss values for the respective plurality of DL reference signals received through different DL transmission/reception beams, identifies a DL reference signal having the least path loss value by DL transmission beam, and selects a UL transmission/reception beam corresponding to a DL transmission/reception beam of the DL reference signal identified as having the least path loss value by DL transmission beam.

18. The MS of claim 14, wherein the controller compares path loss values for the respective plurality of DL reference signals received through different DL transmission/reception beams, identifies an UL transmission beam corresponding to an DL reception beam of a DL reference signal having the least path loss value, and selects a plurality of UL reception beams for the identified UL transmission beam.

19. The MS of claim 14, wherein the controller compares path loss values for the respective plurality of DL reference signals received through different DL transmission/reception beams, identifies a DL reference signal having the least path loss value by DL reception beam, and selects a UL transmission/reception beam corresponding to a DL transmission/reception beam of the DL reference signal identified as having the least path loss value by DL reception beam.

20. The MS of claim 14,
wherein the controller receives control information about a UL transmission power from the BS, and determines a transmission power of the selected transmission beam based on at least one of at least one path loss value among path loss values for DL transmission/reception beams and control information,
wherein the control information comprises at least one of a DL reference signal transmission power of the BS, a target reception power, a UL maximal transmission power, a UL transmission power adjustment value, and a response wait time, and
wherein the transmission power is determined based on at least one of a path loss value corresponding to a selected transmission/reception beam, a minimal or maximal path loss value among path loss values for selected transmission/reception beams, a minimal or maximal path loss value among path loss values for transmission/reception beams having the same UL reception beam as a selected transmission/reception beam, and a minimal or maximal path loss value among path loss values for transmission/reception beams.

21. The MS of claim 14, wherein the UL signal is random access signal used to determining reception beam of the BS.

22. The MS of claim 14, wherein the controller controls a function for receiving control information from the BS; and measures the path loss value based on the received control signal and the reception signal strength of each of the plurality of DL reference signals.

23. A base station (BS) for uplink (UL) control in a wireless communication system supporting beamforming, the apparatus comprising:
a transceiver for transmitting and receiving a signal using at least one antenna;
and
a controller for controlling the transceiver and for transmitting downlink (DL) reference signals to a plurality of reception beams corresponding to at least one antenna of mobile station (MS), using a plurality of BS transmission beams corresponding to at least one antenna of the BS, for receiving at least one UL signal from at least one MS transmission beam, which an MS has selected based on a path loss value, among transmission beams of the MS, and for selecting a reception beam of the BS among at least one reception beam which the UL signal is received, based on a reception strength of the received UL signal.

24. The BS of claim 23, wherein, as a result of selecting the reception beam of the BS among at least one reception beam which the UL signal is received based on the reception strength of the received UL signal, when a plurality of reception beams are selected, the controller performs a function for coupling signals received from the selected plurality of reception beams.

25. The BS of claim 23,
wherein the controller controls a function for transmitting control information, and
wherein the control information comprises at least one of a DL reference signal transmission power of the BS, a target reception power, a UL maximal transmission power, a UL transmission power adjustment value, and a response wait time.

26. The BS of claim 23, wherein the UL signal comprises random access signal.

* * * * *